United States Patent
Kim et al.

(10) Patent No.: US 10,938,113 B1
(45) Date of Patent: Mar. 2, 2021

(54) SYSTEM AND METHOD FOR A SLOT ANTENNA ELEMENT CO-LOCATED AT A SPEAKER GRILL WITH PARASITIC APERTURE

(71) Applicant: Dell Products, LP, Round Rock, TX (US)

(72) Inventors: Changsoo Kim, Cedar Park, TX (US); Suresh K. Ramasamy, Cedar Park, TX (US); Timothy C. Shaw, Austin, TX (US); Geroncio O. Tan, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 16/776,028

(22) Filed: Jan. 29, 2020

(51) Int. Cl.
| | |
|---|---|
| *H01Q 13/10* | (2006.01) |
| *H04B 1/38* | (2015.01) |
| *H04R 1/02* | (2006.01) |
| *H04R 3/00* | (2006.01) |
| *H01Q 1/22* | (2006.01) |

(52) U.S. Cl.
CPC .......... *H01Q 13/10* (2013.01); *H01Q 1/2258* (2013.01); *H04B 1/38* (2013.01); *H04R 1/023* (2013.01); *H04R 1/025* (2013.01); *H04R 3/00* (2013.01); *H04R 2420/07* (2013.01)

(58) Field of Classification Search
None
See application file for complete search history.

(56) References Cited

U.S. PATENT DOCUMENTS

| | | | | |
|---|---|---|---|---|
| 2009/0002248 A1* | 1/2009 | Zhao | ...................... | H01Q 1/243 |
| | | | | 343/722 |
| 2010/0092022 A1* | 4/2010 | Hopkinson | ............ | H04R 1/023 |
| | | | | 381/391 |
| 2012/0194393 A1* | 8/2012 | Uttermann | ............... | H01Q 1/52 |
| | | | | 343/702 |
| 2014/0080553 A1* | 3/2014 | Torset | ................... | G06F 1/1632 |
| | | | | 455/575.8 |
| 2019/0220067 A1* | 7/2019 | Sugiura | .................. | H01Q 21/28 |
| 2020/0044316 A1* | 2/2020 | Ruaro | .................... | H01Q 5/335 |

* cited by examiner

*Primary Examiner* — Qin Zhu

(74) *Attorney, Agent, or Firm* — Prol Intellectual Property Law, PLLC; H. Kenneth Prol

(57) ABSTRACT

An information handling system to wirelessly transmit and receive data includes a processor; a memory; a wireless adapter for transceiving wireless communications via radiofrequency (RF) waves a metal C-cover to house a speaker grill, the speaker grill covering a speaker to emit audio waves; the speaker grill formed within the C-cover, the speaker grill including: a slot formed around a portion of a perimeter of the speaker grill that physically separates the portion of the speaker grill from the C-cover; a shunt formed at a distance along the slot creating a first portion of the slot and a second portion of the slot; a forked antenna element wherein: a first tine of the forked antenna is operatively coupled to the first portion of the slot to excite the first portion of the slot; and a second tine of the forked antenna is operatively coupled to the second portion of the slot to excite the second portion of the slot.

20 Claims, 15 Drawing Sheets

US 10,938,113 B1

SYSTEM AND METHOD FOR A SLOT ANTENNA ELEMENT CO-LOCATED AT A SPEAKER GRILL WITH PARASITIC APERTURE

FIELD OF THE DISCLOSURE

The present disclosure generally relates to information handling systems, and more particularly relates to an information handling system including an antenna system co-located at a speaker grill.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communicating with external devices as well as various input and output (I/O) devices, such as a keyboard, a mouse, a touchscreen and/or a video display. The information handling system may also include one or more buses operable to transmit communications between the various hardware components. The information handling system may also include telecommunication, network communication, and video communication capabilities. Information handling system chassis parts may include case portions such as for a laptop information handling system including the C-cover over components designed with a metal structure. The information handling system may be configurable with an antenna system co-located within a base chassis.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
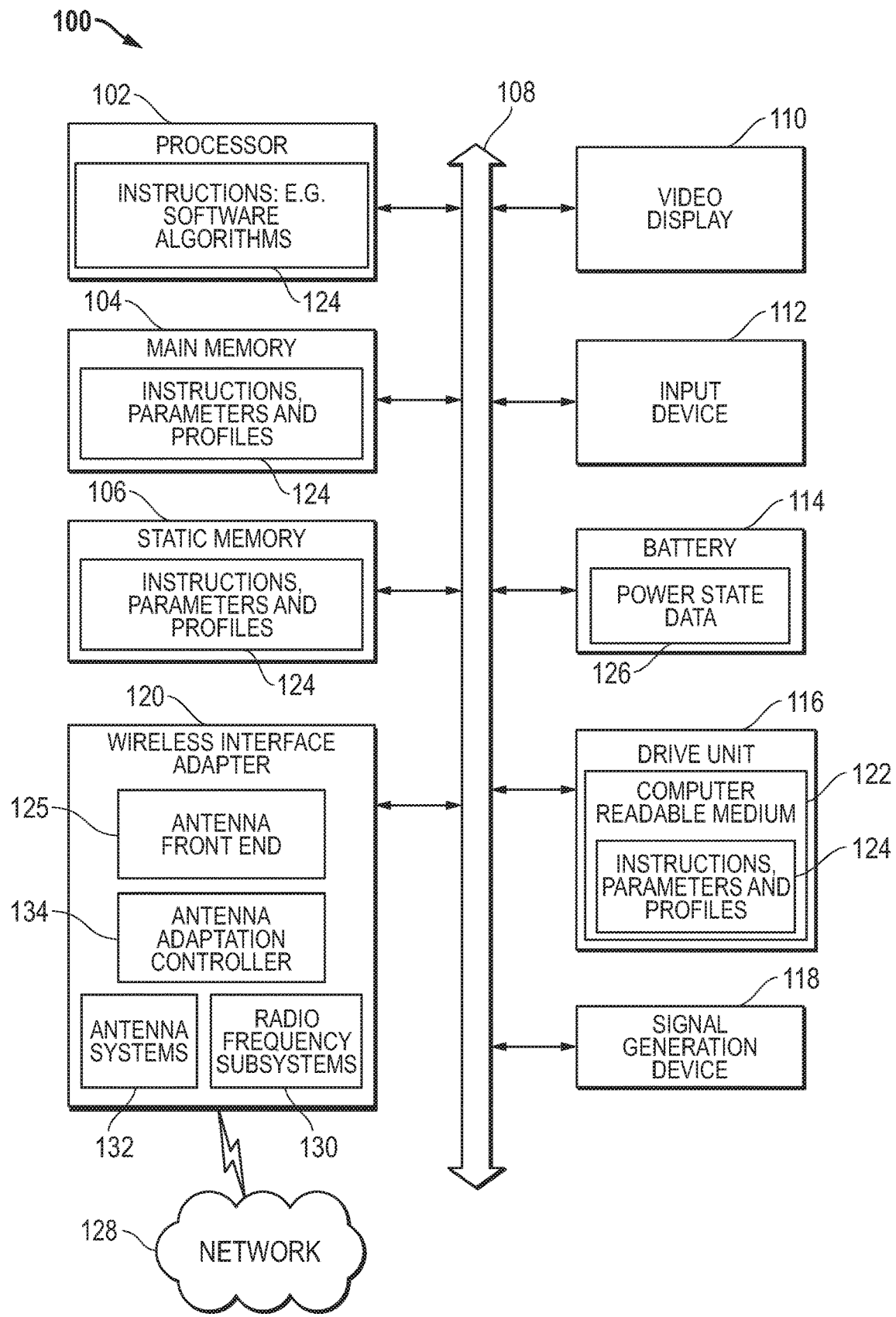
FIG. 1 illustrates an embodiment of information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

For aesthetic, strength, and performance reasons, information handling system chassis parts may be more commonly designed with a metal structure. In an embodiment, a laptop information handling system, for example, may include a plurality of covers for the interior components of the information handling system. In these embodiments, a form factor case may include an "A-cover" which serves as a back cover for a display housing and a "B-cover" which may serve as the bezel, if any, and a display screen of the convertible laptop information handling system in an embodiment. In a further example, the laptop information handling system case may include a "C-cover" housing a keyboard, touchpad, speaker grill, and any cover in which these components are set and a "D-cover" base housing for the laptop information handling system.

With the need for utility of lighter, thinner, and more streamlined devices, the use of full metal portions for the outer covers of the display and base housing (e.g. the A-cover and the D-cover) is desirable for strength as well as aesthetic reasons. At the same time, the demands for wireless operation also increase. This includes addition of many simultaneously operating radiofrequency (RF) systems, addition of more antennas, and utilization of various antenna types. In the present specification and in the appended claims, the term "radio frequency" is meant to be understood as the oscillation rate of an electromagnetic wave. A specific frequency of an electromagnetic wave may have a wavelength that is equal to the speed of light (~300,000 km/s) divided by the frequency.

With new types of networks being developed such as 5G networks, additional antennas that operate on frequencies related to those 5G networks (i.e., high frequency (HF) band, very high frequency (VHF) band, ultra-high frequency (UHF) band, L band, S band, C band, X band, Ku band, K band, Ka band, V band, W band, and millimeter wave bands). So as to communicate with the existing networks as well as the newly developed networks, additional antennas may be added to an information handling system. However, the thinner and more streamlined devices have fewer locations and area available for mounting RF transmitters on these mobile information handling systems. One location within the information handling system where these RF systems and antennas are being pushed out of the A-cover and B-covers. This may lead to placing the RF systems and antennas in the C-cover or D-cover of the information handling systems.

Another consequence of using metal covers is the excitation of the metal surfaces of the covers described herein. This excitation of the metal surfaces leads to destructive interference in the signals sent by the antenna systems. Thus, a streamlined, full metal chassis capable of meeting the increasing wireless operation demands is needed.

Some information handling systems would address these competing needs by providing for cutout portions of a metal outer chassis cover filled with plastic behind which RF transmitters/receivers would be mounted. The cutouts to accommodate radio frequency (RF) transmitters/receivers are often located in aesthetically undesirable locations and require additional plastic components to cover the cutout, thus not fully meeting the streamlining needs. The plastic components may add a component to be manufactured and can be required to be seamlessly integrated into an otherwise smooth metal chassis cover to achieve a level of aesthetics. Further, the plastic portions included may be expensive to machine than aluminum alloy metals, and may require intricate multi-step processes for integrating the metal and plastic parts into a single chassis. This requirement could require difficult and expensive processes to manufacture with a less aesthetically desirable result. Other options included, for aperture type antenna transmitters, creation of an aperture in the metal display panel chassis or base chassis and using the metal chassis as a ground plane for excitation of the aperture.

In addition, in the case of the convertible laptop information handling system, 180-degree configurability may be a feature available to a user during use. Thus, often an antenna such as an aperture antenna system would be located at the top (e.g. A-cover) with a plastic antenna window in a metal chassis cover to radiate in a closed mode, or at the bottom (e.g. C-cover) to radiate in an open mode. Such a configuration could make the display panel housing (e.g. A-cover) or even the base panel housing (e.g. C-cover) thicker, to accommodate antennas and cables behind the plastic panel at the top (or bottom) of either housing. Overall, an addition of a plastic antenna window in an A-cover or C-cover may not meet the streamlining needs. A solution is needed that does not increase the thickness of the metal chassis, and does not require additional components and manufacturing steps such as those associated with installation of extra RF transparent windows to break up the metal chassis in evident locations.

Embodiments of the present disclosure may decrease the complexity and cost of creating chassis for information handling systems by forming the outer chassis (e.g. the A-cover or the D-cover) of metal and implementing a speaker grill, in a C-cover for example, that has a portion of its perimeter that has been physically and operatively disassociated from the C-cover. The co-location of the antenna with the speaker grill and speaker therein thereby decreasing the size of the information handling system. Additionally, the placement of the antenna element behind the speaker grill at a location by a speaker provides for additional space at the B-cover to expand the size of any video display device of the information handling system by removing an antenna or antennas from the B-cover. This increases the usability of the information handling system by allowing for the dual use of a speaker cavity as an antenna cavity. Additionally, the forked antenna element placed behind the speaker grill may be used to direct multiple frequencies of RF (RF) electromagnetic (EM) radiation up and away from the information handling system. In embodiments where the information handling system is to communicate with a wider network, the RF EM signals may be directed towards the horizon up through the C-cover increasing the efficiency of data transmission between the information handling system and any access point in an open configuration.

The metal chassis in embodiments described herein may include a hinge operably connecting the A-cover to the D-cover such that the keyboard, touchpad, and speaker grill enclosed within the C-cover and attached to the D-cover may be placed in a plurality of configurations with respect to the digital display enclosed within the B-cover and attached to the A-cover. The plurality of configurations may include, but may not be limited to, an open configuration in which the A-cover is oriented at a right or obtuse angle from the D-cover (similar to an open laptop computer) and a closed configuration in which the A-cover lies substantially parallel to the D-cover (similar to a closed laptop computer), or other orientations. Despite these different configurations, however, the antenna element co-located with a speaker grill and its speaker provides for the streamlining of the information handling system without compromising the ability of the antenna element to transmit and receive data from and to the information handling system.

Manufacture of embodiments of the present disclosure may involve fewer extraneous parts than previous chassis by forming the exterior or outer portions of the information handling system, including the bottom portion of the D-cover and the top portion of the A-cover, from metal in some embodiments. In order to allow for manufacture of fully or nearly fully metallic outer chassis including the A-cover and the D-cover, embodiments of the present disclosure form a form factor case enclosing the information handling system such that one or more transmitting antennas may be formed within the speaker grill integrated into the C-cover of the information handling system.

The transmitting antennas of embodiments of the present disclosure may include a portion of a speaker grill including an antenna element by forming a slot around a portion of the speaker grill. In embodiments of the present disclosure, a portion of the antenna element may be associated with a first portion of the slot to form an aperture that allows RF EM radiation to resonate within a cavity behind the speaker grill so as to increase the signal power of the transmitted RF EM radiation. In embodiments of the present disclosure, a portion of the antenna element may be associated with a second portion of the slot that is operatively coupled to the speaker grill to allow for excitation of an edge of the speaker grill to transmit RF EM radiation therefrom.

Such a method of placing the antenna element at the speaker grill of the form factor case may exclude the integration of any RF transparent plastic windows elsewhere within the exterior of the A-cover, B-cover, C-cover, or the D-cover, thus decreasing the complexity and cost of manufacture. In other embodiments, a plastic trim ring may be used to visually hide the slot formed around the speaker grill increasing the aesthetic characteristics of the information handling system. The antenna element may then effectively transmit communications signal out from the surface of the C-cover.

In embodiments described herein, the antenna element may be excited using a wireless interface adapter that includes an antenna front end. The antenna front end may, in the embodiments presented herein, be operatively coupled to the antenna element to excite the antenna element in order to cause the antenna element to emit one or a plurality of frequencies based on the target frequency or a plurality of target frequencies. In an embodiment, the slot may be formed into two portions by placing a shunt along a portion of the slot. These first and second portions of the slot may allow a first arm of the antenna element and a second arm of the antenna element to cause the entire antenna system to emit these plurality of target frequencies. In an embodiment, the placement of the shunt along a distance of the slot may set the target frequency or frequencies emitted by the antenna system.

In embodiments described herein, the speaker grill may be flush with a surface of the C-cover, which is the surface most likely to interface with human body parts and be visible to the user. In such embodiments, the plastic trim ring may be visually innocuous to the user while preventing objects from passing through the slot formed between the speaker grill and the remainder of the C-cover. Still further, the plastic trim ring may be held within the slot through the use of an undercut formed by the slot and the remaining border of the speaker grill that prevents the plastic trim ring from being removed. Because the plastic trim ring is made of plastic, any RF EM waves may be passed therethrough during operation of the information handling system while still preventing foreign objects from entering the C-cover via the slot formed.

In embodiments described herein, the dimensions of the slot formed around the first portion and second portion of the speaker grill being separated by the shunt may be selected based on the frequencies to be emitted by the antenna element. In an embodiment, a length of the slot along a single edge of the speaker grill may be between 20 mm and 70 mm. In an embodiment, the length of the second slot is between 20 and 40 mm. These specific lengths may allow the speaker grill to emit lower frequencies or higher frequencies depending on which portion of the slot is associated with the emission of RF EM waves as described herein. In one example embodiment, presented herein, the width of the slot formed between the speaker grill and the C-cover may be 1.5 mm. In the embodiment, the 1.5 mm width may be sufficient to electrically isolate that portions of the speaker grill from the rest of the C-cover thereby preventing any excitation currents being formed at the C-cover and causing electric noise during RF EM transmission by the speaker grill. The slot width may be any dimension sufficient to prevent or mitigate excitation across the slot or grounding between the speaker grill and the rest of the C-cover.

Examples are set forth below with respect to particular aspects of an information handling system including case portions such as for a laptop information handling system including the chassis components designed with a fully metal structure and configurable such that the information handling system may operate in any of several usage mode configurations.

FIG. 1 shows an information handling system 100 capable of administering each of the specific embodiments of the present disclosure. The information handling system 100, in an embodiment, can represent the mobile information handling systems 210, 220, and 230 or servers or systems located anywhere within network 200 described in connection with FIG. 2 herein, including the remote data centers operating virtual machine applications. Information handling system 100 may represent a mobile information handling system associated with a user or recipient of intended wireless communication. A mobile information handling system may execute instructions via a processor such as a microcontroller unit (MCU) operating both firmware instructions or hardwired instructions for the antenna adaptation controller 134 to achieve WLAN or WWAN antenna optimization according to embodiments disclosed herein. The application programs operating on the information handling system 100 may communicate or otherwise operate via concurrent wireless links, individual wireless links, or combinations over any available radio access technology (RAT) protocols including WLAN protocols. These application programs may operate in some example embodiments as software, in whole or in part, on an information handling system while other portions of the software applications may operate on remote server systems. The antenna adaptation controller 134 of the presently disclosed embodiments may operate as firmware or hardwired circuitry or any combination on controllers or processors within the information handing system 100 for interface with components of a wireless interface adapter 120. It is understood that some aspects of the antenna adaptation controller 134 described herein may interface or operate as software or via other controllers associated with the wireless interface adapter 120 or elsewhere within information handling system 100. In an embodiment, the antenna adaptation controller 134 may control an amount of current at a voltage to be sent to an antenna element co-located with a speaker grill formed within the C-cover of the information handling system as described herein. The antenna adaptation controller 134 may, in the embodiments presented herein, be operatively coupled to the antenna element of the speaker grill to excite the antenna element and dynamically switch frequencies based on a target frequency or frequencies to be emitted by the antenna element. In order to switch between frequencies to be emitted from the antenna element, the antenna adaptation controller 134 may include circuitry used to alter the current and voltage applied to the antenna element. The antenna adaptation controller 134 may be communicatively coupled toa tuning module that includes a tunable capacitor and one or more shunt switch paths used to alter the ratio of impedance to capacitive/inductive reactance at the antenna element (e.g., the resonating speaker grill), thereby altering the frequencies emitted by the antenna element. In an embodiment presented herein, the antenna element may be forked or include two arms or tines that interact with two portions of a slot formed around the speaker grill based on the resonance of the first and second arms or tines of the forked antenna element. In an embodiment, a first arm or tine interacts with a first portion of the slot as an aperture antenna to resonate at a first frequency or harmonics thereof. In an embodiment, a second arm or tine interacts with a second portion of the slot in order to cause radio frequency (RF) electromagnetic (EM) to emit from an edge of the speaker grill associated with the second portion to resonate at a second frequency or harmonics thereof. The first and second portions of the slot may be formed by placing a shunt along a distance of the slot.

Information handling system 100 may also represent a networked server or other system from which some software applications are administered or which wireless communications such as across WLAN or WWAN may be conducted. In other aspects, networked servers or systems may operate the antenna adaptation controller 134 for use with a wireless interface adapter 120 on those devices similar to embodiments for WLAN or WWAN antenna optimization operation according to according to various embodiments.

The information handling system 100 may include a processor 102 such as a central processing unit (CPU), a graphics processing unit (GPU), or both. Moreover, the information handling system 100 can include a main memory 104 and a static memory 106 that can communicate with each other via a bus 108. As shown, the information handling system 100 may further include a video display unit 110, such as a liquid crystal display (LCD), an organic light emitting diode (OLED), a flat panel display, or a solid-state display. Display 110 may include a touch screen display module and touch screen controller (not shown) for receiving user inputs to the information handling system 100. Touch screen display module may detect touch or proximity to a display screen by detecting capacitance changes in the display screen. Additionally, the information handling system 100 may include an input device 112, such as a keyboard, and a cursor control device, such as a mouse or touchpad or similar peripheral input device. The information handling system may include a power source such as battery 114 or an A/C power source. The information handling system 100 can also include a disk drive unit 116, and a signal generation device 118, such as a speaker or remote control. The information handling system 100 can include a network interface device such as a wireless adapter 120. The information handling system 100 can also represent a server device whose resources can be shared by multiple client devices, or it can represent an individual client device, such as a desktop personal computer, a laptop computer, a tablet computer, a wearable computing device, or a mobile smart phone.

The information handling system 100 includes an audio system that includes a speaker placed behind the speaker grill. The speaker may be any device the receives a signal from the processor 102 and produces audio as output to the user. This output may be any type of audio including music and notification sounds. As described herein, the speaker may be co-located with the antenna system and speaker grill in order to decrease the footprint of the speaker and antenna systems consumed within the information handling system 100.

The information handling system 100 can include sets of instructions 124 that can be executed to cause the computer system to perform any one or more desired applications. In many aspects, sets of instructions 124 may implement wireless communications via one or more antenna systems 132 available on information handling system 100. In embodiments presented herein, the sets of instructions 124 may implement wireless communications via one or more antenna systems 132 formed as part of a speaker grill formed within a C-cover of a laptop-type information handling system. Operation of WLAN and WWAN wireless communications may be enhanced or otherwise improved via WLAN or WWAN antenna operation adjustments via the methods or controller-based functions relating to the antenna adaptation controller 134 disclosed herein. For example, instructions or a controller may execute software or firmware applications or algorithms which utilize one or more wireless links for wireless communications via the wireless interface adapter as well as other aspects or components. The antenna adaptation controller 134 may execute instructions as disclosed herein for monitoring wireless link state information, information handling system configuration data, SAR proximity sensor detection, or other input data to generate channel estimation and determine antenna radiation patterns. In the embodiments presented herein, the antenna adaptation controller 134 may execute instructions as disclosed herein to transmit a communications signal from an antenna system formed as part of a speaker grill that is excited to resonant a target frequency at a slot formed around a portion of the speaker grill in order to transmit an electromagnetic wave at the target frequency or harmonics thereof. The term "antenna system" described herein is meant to be understood as any object that emits a RF (RF) electromagnetic (EM) wave therefrom. According to some embodiments described herein an "antenna system" includes a forked antenna element co-located with a speaker grill and operatively coupled to a slot or portions of a slot formed around the speaker grill as described herein.

Additionally, the antenna adaptation controller 134 may prevent noise sourced beyond the speaker grill from creating interference with the determined frequency, or harmonics thereof. In the embodiments presented herein, the antenna adaptation controller 134 may execute instructions as disclosed herein to adjust, via a parasitic coupling element, change the directionality and/or pattern of the emitted RF signals from the antenna.

The antenna adaptation controller 134 may implement adjustments to wireless antenna systems and resources via a radio frequency integrated circuit (RFIC) front end 125 and WLAN or WWAN radio module systems within the wireless interface device 120. Aspects of the antenna optimization for the antenna adaptation controller 134 may be included as part of an antenna front end 125 in some aspects or may be included with other aspects of the wireless interface device 120 such as WLAN radio module such as part of the radio frequency (RF) subsystems 130. The antenna adaptation controller 134 described in the present disclosure and operating as firmware or hardware (or in some parts software) may remedy or adjust one or more of a plurality of antenna systems 132 via selecting power adjustments and adjustments to an antenna adaptation network to modify antenna radiation patterns emitted by the speaker grill, slot and antenna element, and parasitic coupling element operations in various embodiments.

Multiple WLAN or WWAN antenna systems that include the speaker grill may operate on various communication frequency bands such as under IEEE 802.11a and IEEE 802.11g (i.e., medium frequency (MF) band, high frequency (HF) band, very high frequency (VHF) band, ultra-high frequency (UHF) band, L band, S band, C band, X band, $K_u$ band, K band, $K_a$ band, V band, W band, and millimeter wave bands) providing multiple band options for frequency channels. Further antenna radiation patterns and selection of antenna options or power levels may be adapted due physical proximity of other antenna systems, of a user with potential SAR exposure, or improvement of RF channel operation according to received signal strength indicator (RSSI), signal to noise ratio (SNR), bit error rate (BER), modulation and coding scheme index values (MCS), or data throughput indications among other factors. In some aspects WWAN or WLAN antenna adaptation controller may execute firmware algorithms or hardware to regulate operation of the one or more antenna systems 132 such as WWAN or WLAN antennas in the information handling system 100 to avoid poor wireless link performance due to poor reception, poor MCS levels of data bandwidth available, or poor indication of throughput due to indications of low RSSI, low power levels available (such as due to SAR), inefficient radiation patterns among other potential effects on wireless link channels used.

Various software modules comprising software application instructions 124 or firmware instructions may be coordinated by an operating system (OS) and via an application programming interface (API). An example operating system may include Windows®, Android®, and other OS types known in the art. Example APIs may include Win 32®, Core Java® API, Android® APIs, or wireless adapter driver API. In a further example, processor 102 may conduct processing of mobile information handling system applications by the information handling system 100 according to the systems and methods disclosed herein which may utilize wireless communications. The computer system 100 may operate as a standalone device or may be connected such as using a network, to other computer systems or peripheral devices. In other aspects, additional processor or control logic may be implemented in graphical processor units (GPUs) or controllers located with radio modules or within a wireless adapter 120 to implement method embodiments of the antenna adaptation controller and antenna optimization according to embodiments herein. Code instructions 124 in firmware, hardware or some combination may be executed to implement operations of the antenna adaptation controller and antenna optimization on control logic or processor systems within the wireless adapter 120 for example.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a PDA, a mobile information handling system, a tablet computer, a laptop computer, a desktop computer, a communications device, a wireless smart phone, wearable computing devices, a control system, a camera, a scanner, a printer, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The disk drive unit 116 may include a computer-readable medium 122 in which one or more sets of instructions 124 such as software can be embedded. Similarly, main memory 104 and static memory 106 may also contain computer-readable medium for storage of one or more sets of instructions, parameters, or profiles 124. The disk drive unit 116 and static memory 106 also contains space for data storage. Some memory or storage may reside in the wireless adapter 120. Further, the instructions 124 that embody one or more of the methods or logic as described herein. For example, instructions relating to the WWAN or WLAN antenna adaptation system or antenna adjustments described in embodiments herein may be stored here or transmitted to local memory located with the antenna adaptation controller 134, antenna front end 125, or wireless module in RF subsystem 130 in the wireless interface adapter 120.

In a particular embodiment, the instructions, parameters, and profiles 124 may reside completely, or at least partially, within a memory, such as non-volatile static memory, during execution of antenna adaptation by the antenna adaptation controller 134 in wireless interface adapter 132 of information handling system 100. As explained, some or all of the WWAN or WLAN antenna adaptation and antenna optimization may be executed locally at the antenna adaptation controller 134, RF front end 125, or wireless module subsystem 130. Some aspects may operate remotely among those portions of the wireless interface adapter or with the main memory 104 and the processor 102 in parts including the computer-readable media in some embodiments.

Battery 114 may be operatively coupled to a power management unit that tracks and provides power stat data 126. This power state data 126 may be stored with the instructions, parameters, and profiles 124 to be used with the systems and methods disclosed herein in determining WWAN or WLAN antenna adaptation and antenna optimization in some embodiments.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. Wireless adapter 120 may include one or more RF subsystems 130 with transmitter/receiver circuitry, modem circuitry, one or more unified antenna front end circuits 125, one or more wireless controller circuits such as antenna adaptation controller 134, amplifiers, antenna systems 132 and other radio frequency (RF) subsystem circuitry 130 for wireless communications via multiple radio access technologies. Each RF subsystem 130 may communicate with one or more wireless technology protocols. The RF subsystem 130 may contain individual subscriber identity module (SIM) profiles for each technology service provider and their available protocols for subscriber-based radio access technologies such as cellular LTE communications. The wireless adapter 120 may also include antenna systems 132 which may be tunable antenna systems or may include an antenna adaptation network for use with the system and methods disclosed herein to optimize antenna system operation. Additional antenna system adaptation network circuitry (not shown) may also be included with the wireless interface adapter 120 to implement WLAN or WWAN modification measures as described in various embodiments of the present disclosure.

In some aspects of the present disclosure, a wireless adapter 120 may operate two or more wireless links. In a further aspect, the wireless adapter 120 may operate the two or more wireless links with a single, shared communication frequency band such as with the Wi-Fi WLAN operation or 5G LTE standard WWAN operations in an example aspect. For example, a 5 GHz wireless communication frequency band may be apportioned under the 5G standards for communication on either small cell WWAN wireless link operation or Wi-Fi WLAN operation as well as other wireless activity in LTE, WiFi, WiGig, Bluetooth, or other communication protocols. In some embodiments, the shared, wireless communication bands may be transmitted through one or a plurality of antennas. In an embodiment, the shared, wireless communication bands may be transmitted through one or a plurality of antennas each co-located with a plurality of speaker grills as described herein. Other communication frequency bands are contemplated for use with the embodiments of the present disclosure as well.

In other aspects, the information handling system 100 operating as a mobile information handling system may operate a plurality of wireless adapters 120 for concurrent radio operation in one or more wireless communication bands. The plurality of wireless adapters 120 may further operate in nearby wireless communication bands in some disclosed embodiments. Further, harmonics, environmental wireless conditions, and other effects may impact wireless link operation when a plurality of wireless links are operating as in some of the presently described embodiments. The series of potential effects on wireless link operation may cause an assessment of the wireless adapters 120 to potentially make antenna system adjustments according to the WWAN or WLAN antenna adaptation control system of the present disclosure.

The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. Wireless adapter 120 and antenna adaptation controller 134 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both license and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band in example embodiments. WLAN, for example, may also operate at a 2.4 GHz band. WWAN may operate in a number of bands, some of which are propriety but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well. In the example embodiment, mobile information handling system 100 includes both unlicensed wireless RF communication capabilities as well as licensed wireless RF communication capabilities. For example, licensed wireless RF communication capabilities may be available via a subscriber carrier wireless service. With the licensed wireless RF communication capability, WWAN RF front end may operate on a licensed WWAN wireless radio with authorization for subscriber access to a wireless service provider on a carrier licensed frequency band. With the advent of 5G networks, any number of protocols may be implemented including global system for mobile communications (GSM) protocols, general packet radio service (GPRS) protocols, enhanced data rates for GSM evolution (EDGE) protocols, code-division multiple access (CDMA) protocols, universal mobile telecommunications system (UMTS) protocols, long term evolution (LTE) protocols, long term evolution advanced (LTE-A) protocols, WiMAX, LTE, and LTE Advanced, LTE-LAA, small cell WWAN and IP multimedia core network subsystem (IMS) protocols, for example, and any other communications protocols suitable for the method(s), system(s) and device(s) described herein, including any proprietary protocols. The protocols implemented may operate on certain 5G frequencies such as high frequency (HF) bands, very high frequency (VHF) bands, ultra-high frequency (UHF) bands, L band, S band, C band, X band, Ku band, K band, Ka band, V band, W band, and millimeter wave bands, among others.

The wireless adapter 120 can represent an add-in card, wireless network interface module that is integrated with a main board of the information handling system or integrated with another wireless network interface capability, or any combination thereof. In an embodiment the wireless adapter 120 may include one or more RF subsystems 130 including transmitters and wireless controllers such as wireless module subsystems for connecting via a multitude of wireless links under a variety of protocols. In an example embodiment, an information handling system may have an antenna system transmitter 132 for 5G small cell WWAN, Wi-Fi WLAN or WiGig connectivity and one or more additional antenna system transmitters 132 for macro-cellular communication. The RF subsystems 130 include wireless controllers to manage authentication, connectivity, communications, power levels for transmission, buffering, error correction, baseband processing, and other functions of the wireless adapter 120.

The RF subsystems 130 of the wireless adapters may also measure various metrics relating to wireless communication pursuant to operation of an antenna system as in the present disclosure. For example, the wireless controller of a RF subsystem 130 may manage detecting and measuring received signal strength levels, bit error rates, signal to noise ratios, latencies, power delay profile, delay spread, and other metrics relating to signal quality and strength. Such detected and measured aspects of wireless links, such as WWAN or WLAN links operating on one or more antenna systems 132, may be used by the antenna adaptation controller to adapt the antenna systems 132 according to an antenna adaptation network according to various embodiments herein. In one embodiment, a wireless controller of a wireless interface adapter 120 may manage one or more RF subsystems 130. The wireless controller also manages transmission power levels which directly affect RF subsystem power consumption as well as transmission power levels from the plurality of antenna systems 132. The transmission power levels from the antenna systems 132 may be relevant to specific absorption rate (SAR) safety limitations for transmitting mobile information handling systems. To control and measure power consumption via a RF subsystem 130, the RF subsystem 130 may control and measure current and voltage power that is directed to operate one or more antenna systems 132.

The wireless network may have a wireless mesh architecture in accordance with mesh networks described by the wireless data communications standards or similar standards in some embodiments but not necessarily in all embodiments. The wireless adapter 120 may also connect to the external network via a WPAN, WLAN, WWAN or similar wireless switched Ethernet connection. The wireless data communication standards set forth protocols for communications and routing via access points, as well as protocols for a variety of other operations. Other operations may include handoff of client devices moving between nodes, self-organizing of routing operations, or self-healing architectures in case of interruption.

In some embodiments, software, firmware, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal; so that a device connected to a network 128 can communicate voice, video or data over the network 128. Further, the instructions 124 may be transmitted or received over the network 128 via the network interface device or wireless adapter 120.

Information handling system 100 includes one or more application programs 124, and Basic Input/Output System and firmware (BIOS/FW) code 124. BIOS/FW code 124 functions to initialize information handling system 100 on power up, to launch an operating system, and to manage input and output interactions between the operating system and the other elements of information handling system 100. In a particular embodiment, BIOS/FW code 124 reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in drive 116, in a ROM (not illustrated) associated with information handling system 100, in an option-ROM (not illustrated) associated with various devices of information handling system 100, in storage system 107, in a storage system (not illustrated) associated with network channel of a wireless adapter 120, in another storage medium of information handling system 100, or a combination thereof. Application programs 124 and BIOS/FW code 124 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Figure 2:
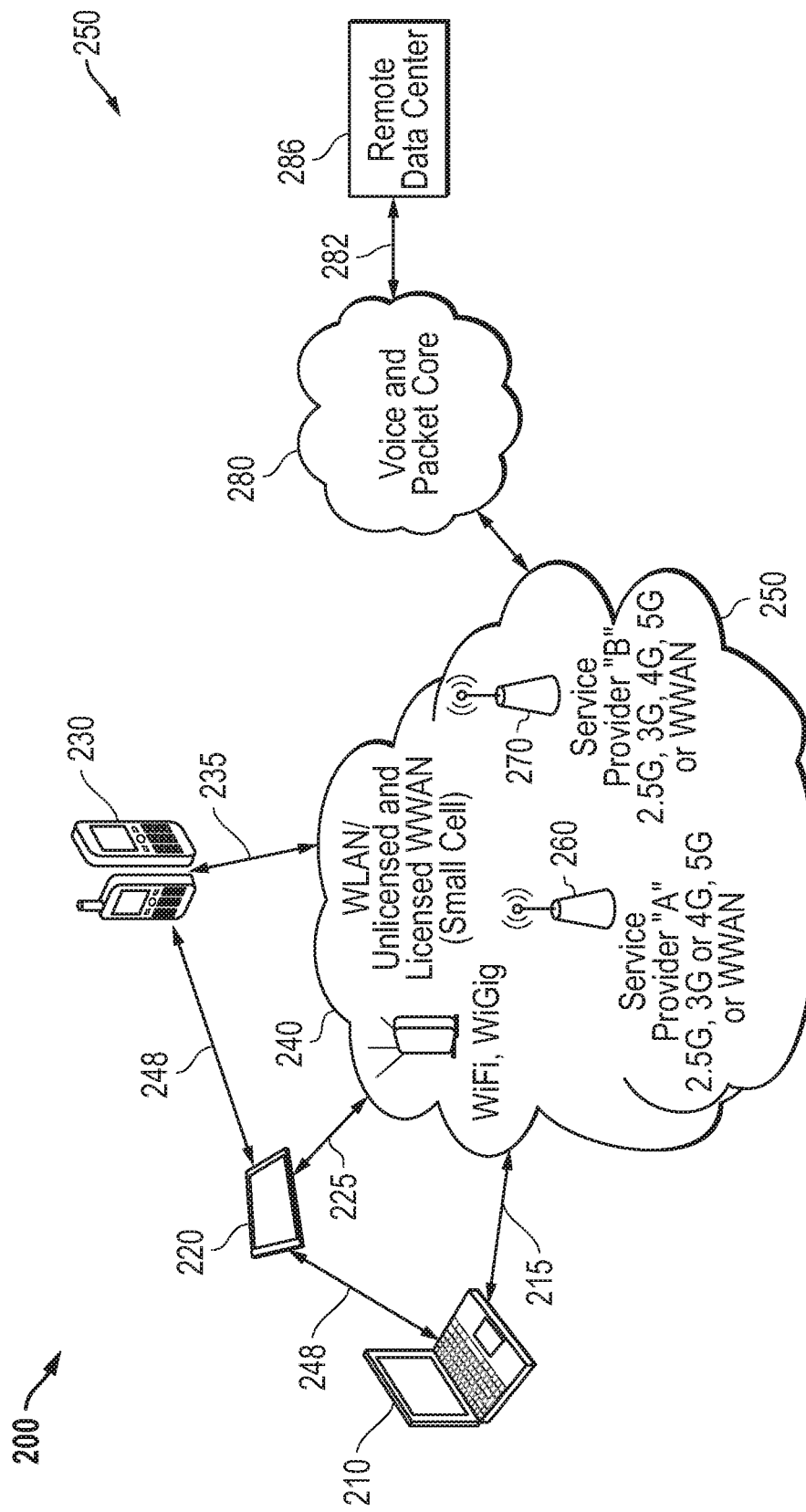
FIG. 2 is a block diagram of a network environment offering several communication protocol options and mobile information handling systems according to an embodiment of the present disclosure.

FIG. 2 illustrates a network 200 that can include one or more information handling systems 210, 220, 230. In a particular embodiment, network 200 includes networked mobile information handling systems 210, 220, and 230, wireless network access points, and multiple wireless connection link options. A variety of additional computing resources of network 200 may include client mobile information handling systems, data processing servers, network storage devices, local and wide area networks, or other resources as needed or desired. As partially depicted, systems 210, 220, and 230 may be a laptop computer, tablet computer, 360-degree convertible systems, wearable computing devices, or a smart phone device. These mobile information handling systems 210, 220, and 230, may access a wireless local network 240, or they may access a macro-cellular network 250. For example, the wireless local network 240 may be the wireless local area network (WLAN), a wireless personal area network (WPAN), or a wireless wide area network (WWAN). In an example embodiment, LTE-LAA WWAN may operate with a small-cell WWAN wireless access point option.

Since WPAN or Wi-Fi Direct Connection 248 and WWAN networks can functionally operate similar to WLANs, they may be considered as wireless local area networks (WLANs) for purposes herein. Components of a WLAN may be connected by wireline or Ethernet connections to a wider external network. For example, wireless network access points may be connected to a wireless network controller and an Ethernet switch. Wireless communications across wireless local network 240 may be via standard protocols such as IEEE 802.11 Wi-Fi, IEEE 802.11ad WiGig, IEEE 802.15 WPAN, IEEE 802.11, IEEE 1914/1904, IEEE P2413/1471/42010, or 5G small cell WWAN communications such as eNodeB, or similar wireless network protocols. Alternatively, other available wireless links within network 200 may include macro-cellular connections 250 via one or more service providers 260 and 270. Service provider macro-cellular connections may include 2G standards such as GSM, 2.5G standards such as GSM EDGE and GPRS, 3G standards such as W-CDMA/UMTS and CDMA 2000, 4G standards, or 5G standards including WiMAX, LTE, and LTE Advanced, LTE-LAA, small cell WWAN, and the like. Again, any number of protocols, 5G or otherwise, may be implemented as described herein. The protocols implemented may operate on certain 5G frequencies such as high frequency (HF) bands, very high frequency (VHF) bands, ultra-high frequency (UHF) bands, L band, S band, C band, X band, Ku band, K band, Ka band, V band, W band, and millimeter wave bands, among others. Frequency bands utilized may change for 5G and other protocols depending upon jurisdiction or location of operation of the antenna systems described herein.

Wireless local network 240 and macro-cellular network 250 may include a variety of licensed, unlicensed or shared communication frequency bands as well as a variety of wireless protocol technologies ranging from those operating in macrocells, small cells, picocells, or femtocells.

In some embodiments according to the present disclosure, a networked mobile information handling system 210, 220, or 230 may have a plurality of wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple protocols. Similarly, a single antenna or plural antennas may be used on each of the wireless communication devices. Example competing protocols may be local wireless network access protocols such as Wi-Fi/WLAN, WiGig, and small cell WWAN in an unlicensed, shared communication frequency band. Example communication frequency bands may include unlicensed 5 GHz frequency bands or 3.5 GHz conditional shared communication frequency bands under FCC Part 96. Wi-Fi ISM frequency bands that may be subject to sharing include 2.4 GHz, 60 GHz, 900 MHz or similar bands as understood by those of skill in the art. Within local portion of wireless network 250 access points for Wi-Fi or WiGig as well as small cell WWAN connectivity may be available in 5G technology. This may create situations where a plurality of antenna systems are operating on a mobile information handling system 210, 220 or 230 via concurrent communication wireless links on both WLAN and WWAN and which may operate within the same, adjacent, or otherwise interfering communication frequency bands. The antenna may be a transmitting antenna that includes high-band, medium-band, low-band, and unlicensed band transmitting antennas. Alternatively, embodiments may include a single transceiving antennas capable of receiving and transmitting, and/or more than one transceiving antennas. Each of the antennas included in the information handling system 100 in an embodiment may be subject to the FCC regulations on specific absorption rate (SAR). The antenna in the embodiments described herein is an aperture antenna (i.e., a cavity-backed dynamic tunable aperture antenna system) intended for efficient use of space within a metal chassis of an information handling system. Aperture antennas in embodiments of the present disclosure may be an effective improvement on wireless antennas employed in previous information handling systems.

The voice and packet core network 280 may contain externally accessible computing resources and connect to a remote data center 286. The voice and packet core network 280 may contain multiple intermediate web servers or other locations with accessible data (not shown). The voice and packet core network 280 may also connect to other wireless networks similar to 240 or 250 and additional mobile information handling systems such as 210, 220, 230 or similar connected to those additional wireless networks. Connection 282 between the wireless network 240 and remote data center 286 or connection to other additional wireless networks may be via Ethernet or another similar connection to the world-wide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a mobile information handling system or may connect directly to one or more mobile information handling systems 210, 220, and 230. Alternatively, mobile information handling systems 210, 220, and 230 may connect to the external network via base station locations at service providers such as 260 and 270. These service provider locations may be network connected via backhaul connectivity through the voice and packet core network 280.

Remote data centers may include web servers or resources within a cloud environment that operate via the voice and packet core 280 or other wider internet connectivity. For example, remote data centers can include additional information handling systems, data processing servers, network storage devices, local and wide area networks, or other resources as needed or desired. Having such remote capabilities may permit fewer resources to be maintained at the mobile information handling systems 210, 220, and 230 allowing streamlining and efficiency within those devices. Similarly, remote data center permits fewer resources to be maintained in other parts of network 200.

Although 215, 225, and 235 are shown connecting wireless adapters of mobile information handling systems 210, 220, and 230 to wireless networks 240 or 250, a variety of wireless links are contemplated. Wireless communication may link through a wireless access point (Wi-Fi or WiGig), through unlicensed WWAN small cell base stations such as in network 240 or through a service provider tower such as that shown with service provider A 260 or service provider B 270 and in network 250. In other aspects, mobile information handling systems 210, 220, and 230 may communicate intra-device via 248 when one or more of the mobile information handling systems 210, 220, and 230 are set to act as an access point or even potentially an WWAN connection via small cell communication on licensed or unlicensed WWAN connections. For example, one of mobile information handling systems 210, 220, and 230 may serve as a Wi-Fi hotspot in an embodiment. Concurrent wireless links to information handling systems 210, 220, and 230 may be connected via any access points including other mobile information handling systems as illustrated in FIG. 2.

Figure 3A:
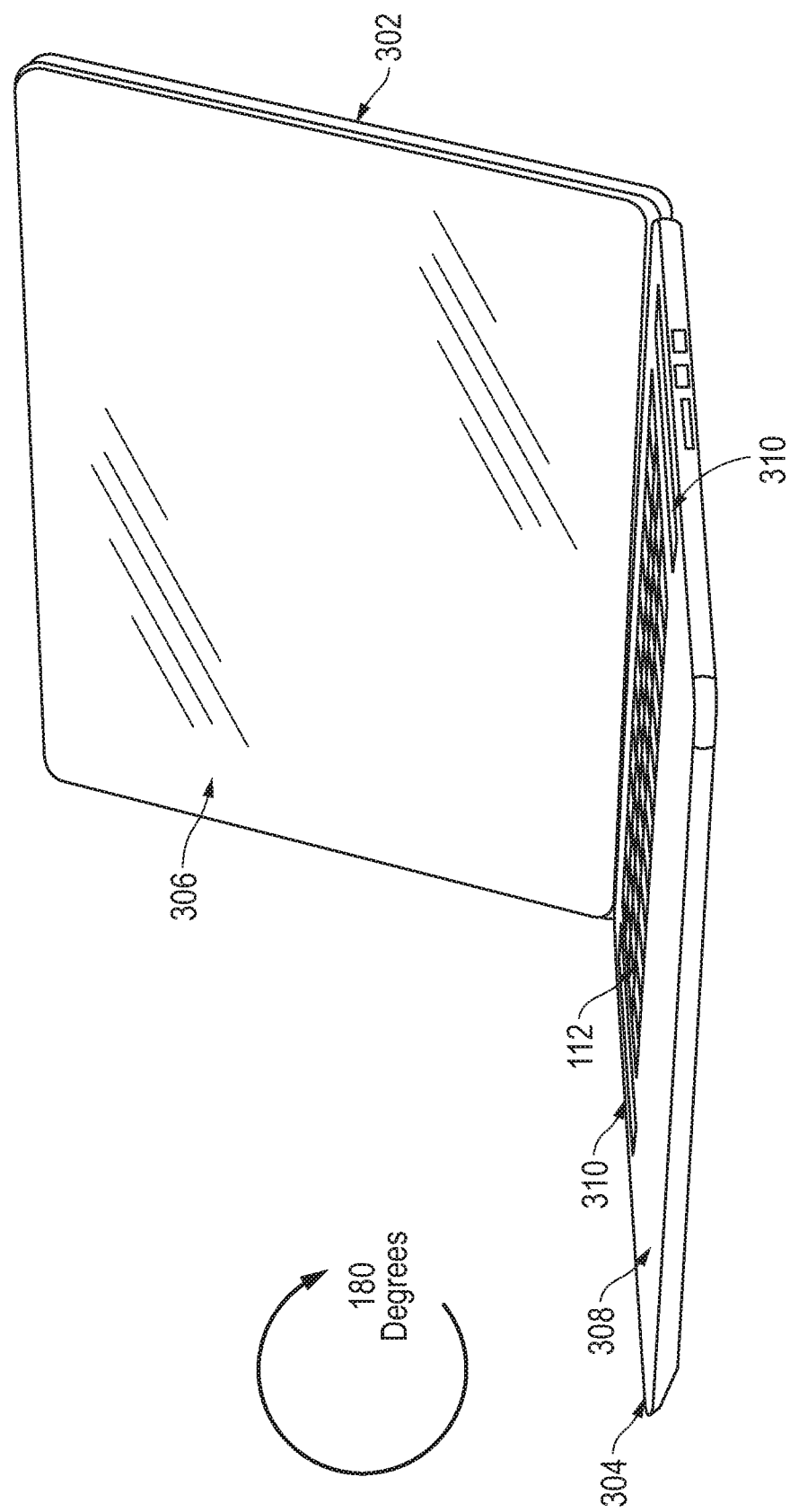
FIG. 3A is a graphical illustration of an information handling system placed in an open configuration according to an embodiment of the present disclosure.

FIG. 3A is a graphical illustration of a metal chassis including a base chassis and display chassis placed in an open configuration according to an embodiment of the present disclosure. The open configuration is shown for illustration purposes. It is understood that a closed configuration would have the lid chassis fully closed onto the base chassis. The metal chassis 300 in an embodiment may comprise an outer metal case or shell of an information handling system such as a tablet device, laptop, or other mobile information handling system. As shown in FIG. 3A, the metal chassis 300, in an embodiment, may further include a plurality of chassis or cases. For example, the metal chassis 300 may further include an A-cover 302 functioning to enclose a portion of the information handling system. As another example, the metal chassis 300, in an embodiment, may further include a D-cover 304 functioning to enclose another portion of the information handling system along with a C-cover 308 which may include a transmitting/receiving antenna according to the embodiments described herein. The C-cover 308 may include, for example, a keyboard, a trackpad, or other input/output (I/O) device. When placed in the closed configuration, the A-cover 302 forms a top outer protective shell, or a portion of a lid for the information handling system, while the D-cover 304 forms a bottom outer protective shell, or a portion of a base. When in the fully closed configuration, the A-cover 302 and the D-cover 304 would be substantially parallel to one another.

In some embodiments, both the A-cover 302 and the D-cover 304 may be comprised entirely of metal. In some embodiments, the A-cover 302 and D-cover 304 may include both metallic and plastic components. For example, plastic components that are radio-frequency (RF) transparent may be used to form a portion of the C-cover 308 where a speaker grill 310 interfaces with the C-cover 308. According to the embodiments of the present disclosure, the speaker grill 310 may be formed as a part of the C-cover. In these examples, the speaker grill 310 may be formed within the C-cover 308 by forming a speaker grill 310 within a side portion of the C-cover 308 as shown in FIG. 3A. In the embodiments described herein, a portion of the speaker grill 310 may be physically separated from the C-cover 308 by forming a slot around a portion of the speaker grill 310. As is described herein, the length of the slot around the portion of the speaker grill 310 may be dependent on a target frequency or frequencies to be emitted upon excitation of the speaker grill 310 by a tuning module. In an embodiment, the slot may be bifurcated by placing a shunt along a distance of the the slot thereby creating a first portion of the slot and a second portion of the slot. Additionally, in the present specification and in the appended claims, the term "portion" is meant to be understood as a part of a whole. Therefore, in the embodiments disclosed herein, the slot formed around the speaker grill 310 may be less than a total cut-out of the speaker grill 310 from the C-cover 308. Additionally, in the embodiments described herein, the first portion of the slot may be less than the whole length of the slot while the second portion of the slot may also be less than the whole length of the slot.

The speaker grill 310 may, therefore, be an integral part of the C-cover 308. In these examples, the speaker grill 310 may also be used to cover or protect a speaker placed below the C-cover 308 and speaker grill 310 in order to provide audio output to a user of the information handling system. The formation of the antenna system that incorporates the speaker grill 310 as the excitation object allows for the removal of the antenna system from the A-cover 302 and B-cover 306 or a place for additional antenna systems when several antenna systems are deployed. For example, the space within the A-cover 302/B-cover 306 assembly where an antenna may have been placed can be eliminated allowing for a relatively larger video display device placed therein in some embodiments. As a result of placing the antenna element within the C-cover 308 as part of the speaker grill 310, the capabilities of the information handling system may be increased while also increasing user satisfaction during use.

In an embodiment, the speaker grill 310 may be formed at any location on the C-cover 308. Therefore, although FIG. 3A shows two speaker grills 310 located to the left and right of a keyboard 112, the present specification contemplates that the speaker grill 310 or speaker grills 310 may be formed along any surface of the C-cover 308. In the embodiments, each of the individual speaker grills 310 may be excited to emit an RF EM wave signal at different frequencies allowing for the ability of the information handling system to communicate on a variety of RATs.

In an embodiment, the A-cover 302 may be movably connected to a back edge of the D-cover 304 via one or more hinges. In this configuration shown in FIG. 3A the hinges allow the A-cover 302 to rotate from and to the D-cover 304 allowing for multiple orientations of the information handling system as described herein. In an embodiment, the information handling system may include a sensor to detect the orientation of the information handling system and activate or deactivate any of a number of antenna systems associated with the speaker grill 310 or deployed elsewhere on the information handling system based on the occurrence of any specific orientation. For example, the speaker grill 310 co-located with the antenna of the present disclosure may be activated in an open configuration in some embodiments.

Figure 3B:
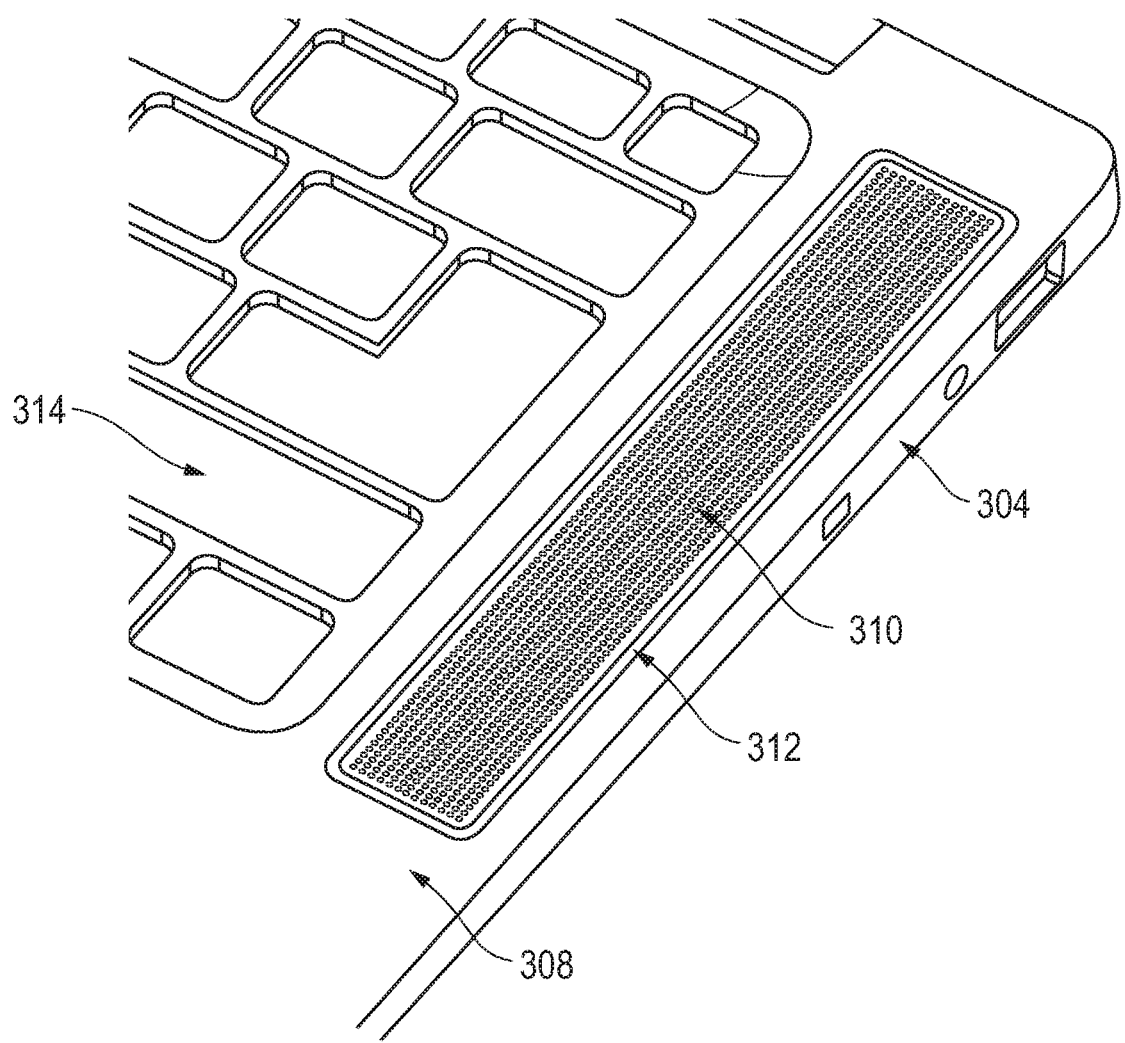
FIG. 3B is a perspective view of a graphical illustration of a C-cover and speaker grill of an information handling system according to an embodiment of the present disclosure.

FIG. 3B is a perspective graphical illustration of a C-cover 308 and speaker grill 310 of an information handling system according to an embodiment of the present disclosure. FIG. 3B shows the C-cover 308 with a side wall of the D-cover 304 but not the keyboard 112 as described in connection with FIG. 3A. The present specification contemplates that, during assembly, the D-cover 304 and keyboard 112 along with other components of the information handling system are to be assembled together with the C-cover 308 and its speaker grill 310.

The C-cover 308 may include a number of vias 314 through which keys of a keyboard may be placed. Additionally, the C-cover 308 may include a speaker grill 310. The speaker grill 310, as described herein, may serve a plurality of functions. A first function may include a physical barrier between the user and a speaker positioned below the speaker grill 310 and C-cover 308. This speaker may receive input from a processor and provide output (i.e., music and notification sounds) to a user during operation of the information handling system. As a physical carrier, the speaker grill 310 may prevent a user from touch and damaging the speaker as well as other delicate elements placed below the C-cover 308. In an embodiment, the speaker grill 310 may include a number of holes through which sound waves from the speaker may pass.

A second function of the speaker grill 310 is to propagate RF EM waves emitted from the antenna element placed below the speaker grill. In the embodiments described herein, the speaker grill 310 may have a slot formed around a portion of the circumference of the speaker grill 310. The slot may be cut between the speaker grill 310 and the C-cover 308 using any type of manufacturing process including laser ablation, electroforming, anisotropic etching, photolithography, or any other type of precision fabrication processing. As described herein, the slot may be formed along one edge of the speaker grill 310 or along multiple edges of the speaker grill 310. In a specific embodiment, the slot may be formed around a first edge of the speaker grill 310, wrap around to a second edge of the speaker grill 310, and continue onto terminate along a third edge of the speaker grill 310. In this specific embodiment, the slot may make a U-shaped slot around the perimeter of the speaker grill 310. In an embodiment, the slot is bifurcated by a shunt part way down the slot formed around the speaker grill.

In order to prevent physical access by objects or the user below the C-cover 308, the speaker grill 310 includes a plastic trim ring 312 placed within the formed slot. In an embodiment, the plastic trim ring 312 may be placed around a portion of the speaker grill 310. In an example, the plastic trim ring 312 may be placed along an entirety of the perimeter of the speaker grill 310. In either embodiment, the plastic trim ring 312 placed around the speaker grill 310 may be formed to lie flush with the speaker grill 310, the C-cover 308, or both. In an embodiment, the plastic trim ring 312 may be formed into the slot 318 and trench 322 using nano-molding technology (NMT). In this embodiment, the metal of the C-cover 308 may be directly bonded to the plastic trim ring 312 by creating the slot 318 and trench 322 as well as the undercut by, for example, acid etching those structures. The NMT may, once the slot 318, trench 322, and undercut are acid-etched, continue with molding the plastic trim ring 312 into the slot 318 and trench 322 using compression molding, transfer molding, injection molding, or other types of plastic molding processes. Placing the plastic trim ring 312 flush with the speaker grill 310, the C-cover 308, or both may render the information handling system aesthetically appealing while also preventing objects from passing through the C-cover 308 via the slot. Still further, because the plastic trim ring 312 is made of a RF transparent material (e.g., plastic), RF EM wave emissions from the antenna element may still be allowed to propagate from the speaker grill 310 without being blocked by a RF non-transparent material. In any embodiment described herein, the color of the plastic trim ring 312 may be chosen to match the color of the C-cover 308 so as to hide the existence of the plastic trim ring 312 thereby increasing the aesthetics of the information handling system.

Although FIG. 3B shows a single speaker grill 310 speaker grill 310 formed into the C-cover 308, the present specification contemplates that any number of speaker grills 310 may be formed into the C-cover 308. In this embodiment, the length and width of the slot formed along the perimeter of the speaker grill 310 may be distinguished from slots associated with other speaker grills 310 so as to alter the band of RF EM waves capable of being emitted from that specific speaker grill 310. Consequently, the information handling system may include multiple speaker grills 310 capable of transmitting data at multiple RF bands consecutively or concurrently. This increases the communication capabilities of the information handling system such that, in some embodiments, the information handling system can communicate via LTE, WiFi, WiGig, Bluetooth, or other communication protocols based on the frequency band emitted by the individual antenna elements with the speaker grills. With the advent of 5G networks, any number of protocols may be implemented in some embodiments herein including global system for mobile communications (GSM) protocols, general packet radio service (GPRS) protocols, enhanced data rates for GSM evolution (EDGE) protocols, code-division multiple access (CDMA) protocols, universal mobile telecommunications system (UMTS) protocols, long term evolution (LTE) protocols, long term evolution advanced (LTE-A) protocols, WiMAX, LTE, and LTE Advanced, LTE-LAA, small cell WWAN and IP multimedia core network subsystem (IMS) protocols, for example, and any other communications protocols suitable for the method (s), system(s) and device(s) described herein, including any proprietary protocols. The protocols implemented may operate on certain 5G frequencies such as high frequency (HF) bands, very high frequency (VHF) bands, ultra-high frequency (UHF) bands, L band, S band, C band, X band, Ku band, K band, Ka band, V band, W band, and millimeter wave bands, among others. These frequencies may depend on jurisdiction and location of operation. Thus, according to the embodiments presented herein, the antenna systems being incorporated into the speaker grill 310 allows for flexibility in the type of antenna being formed at the speaker grill 310 thereby increasing the ability for a user to, during purchase, determine how the information handling system is to communicate with a wireless infrastructure by selecting RF EM frequency band is going to be used for these communications. Additionally, placement of each of the speaker grills 310 or the speaker grill 310 shown in FIG. 3B may be anywhere on the surface of the C-cover 308 with the slot cut out around a portion of the perimeter of the speaker grill 310 on the C-cover 308. Also, by incorporating the antenna system described herein behind the speaker grill 310 allows for more compact and streamlined information handling system thereby adding to the aesthetics of the information handling system.

In an embodiment presented herein, the plastic trim ring 312 may be maintained within the slot formed around the speaker grill 310 via an undercut. The undercut may be formed so as to prevent the plastic trim ring 312 from being removed vertically from the slot formed. In an embodiment, the plastic trim ring 312 may be formed into the slot 318 and trench 322 using nano-molding technology (NMT). In this embodiment, the metal of the C-cover 308 may be directly bonded to the plastic trim ring 312 by creating the slot 318 and trench 322 as well as the undercut by, for example, acid etching those structures. The NMT may, once the slot 318, trench 322, and undercut are acid-etched, continue with molding the plastic trim ring 312 into the slot 318 and trench 322 using compression molding, transfer molding, injection molding, or other types of plastic molding processes. As described herein, because the slot is not formed completely around the speaker grill 310, a portion of the perimeter of the speaker grill 310 may have a trench formed around the perimeter that does not cut entirely through the C-cover 308 as the slot does. In this embodiment, the trench may also include an undercut that prevents the plastic trim ring 312 form being removed vertically (i.e., perpendicular to the surface of the C-cover 308) from the C-cover 308 thereby exposing the trench and slot as described herein.

Figure 3C:
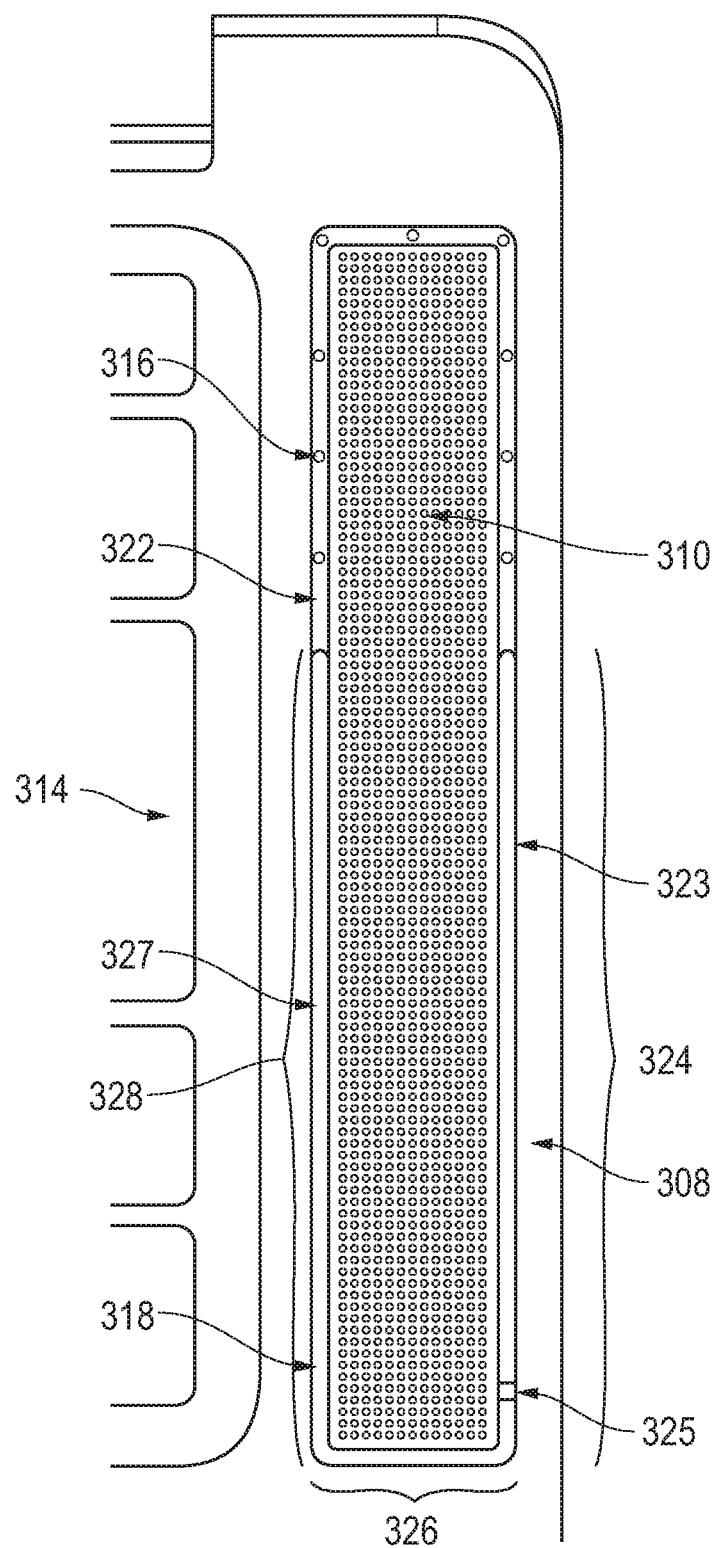
FIG. 3C is a top view illustration of a C-cover and speaker grill of an information handling system according to an embodiment of the present disclosure.

FIG. 3C is another graphical illustration of the C-cover 308 and speaker grill 310 of an information handling system according to an embodiment of the present disclosure. As shown in FIG. 3C, the speaker grill 310 has the plastic trim ring (not shown) removed from the slot 318 and trench 322. A distinguishing characteristic between the slot 318 and the trench 322 is that the slot 318 has been cut entirely through the C-cover 308. As described herein, the length of the slot 318 around the speaker grill 310 may be selected based on the frequency bands to be emitted by the speaker grill 310 when the speaker grill 310 is excited by the tuning module described herein. All remaining portions of the perimeter of the speaker grill 310 may have a trench 322 formed around the speaker grill 310.

As described herein, the trench 322 and slot 318 may have an undercut formed therein that prevents the plastic trim ring from being removed. This undercut may, in an embodiment, be formed along an edge of the C-cover 308 where the slot 318 and trench 322 are formed so that a portion of the plastic trim ring 312 may be locked into the trench 322 and slot 318 when placed or formed therein. In an embodiment, the plastic trim ring may be formed into the slot 318 and trench 322 using nano-molding technology (NMT). In this embodiment, the metal of the C-cover 308 may be directly bonded to the plastic trim ring by creating the slot 318 and trench 322 as well as the undercut by, for example, acid etching those structures. The NMT may, once the slot 318, trench 322, and undercut are acid-etched, continue with molding the plastic trim ring into the shown slot 318 and trench 322 using compression molding, transfer molding, injection molding, or other types of plastic molding processes.

In an embodiment, the trench 322 may include at least one interlocking hole 316. The interlocking hole 316 may be used to secure the trim ring within the trench 322 when the trim ring is coupled to the slot 318 and trench 322. Similar to the undercut formed in the trench 322 and slot 318, the interlocking hole 316 may secure the trim ring within the trench 322 and, in this case, prevent the trim ring form moving laterally within the trench 322 and slot 318. The interlocking hole 316 may, therefore, tightly secure the trim ring within the trench 322 increasing the stability of the plastic trim ring around the speaker grill 310 and maintaining the aesthetic characteristics of the speaker grill 310 of the information handling system.

In the embodiments presented herein, the slot may be bifurcated by a shunt 325. The shunt 325 may form a first section 323 of the slot 318 and a second section 327 to be formed in the slot 318. Although FIG. 3C shows a specific placement of the shunt 325 along a distance of the slot 318, the present specification contemplates that the shunt 325 can be placed at any distance along the length of the slot 318 so as to accommodate for a specific resonant frequency or frequencies and harmonics thereof that are to be produced by the antenna element placed behind the speaker grill 310 via first section 323 or second section 327.

Similar to FIG. 3B, the C-cover 308 is depicted in FIG. 3C as including a plurality of vias 314. The vias 314 may each receive a key from a keyboard. Thus, although FIG. 3C does not show a keyboard operatively coupled to the C-cover 308, the present specification contemplates that, during assembly, a keyboard may be operatively coupled to the C-cover 308. As described herein, the slot 318 may have a first length along a first edge 324 of the speaker grill 310, a second length along a second edge 326 of the speaker grill 310, and a third length along a third edge 328 of the speaker grill 310. In this embodiment, the slot 318 has been formed around a lower portion of the speaker grill 310. In an embodiment the first length along a first edge 324 may be between 20 mm and 70 mm so that the slot 318 formed along a portion of the perimeter of the speaker grill may be tuned to match a specific RF wavelength associated with, for example, a cellular communication protocol as described herein. In any embodiment presented herein, the overall length of the slot 318 (i.e., the length of the first section 323 of the slot 318 and the length of the second section 327 of the slot 318) formed at a perimeter of the speaker grill 310 may be created based on the RF EM frequencies to be emitted by the speaker grill 310 and the present specification contemplates other lengths of the slot 318 in order to be tuned to emit other bands of RF EM waves. In an embodiment where the length of the slot is 70 mm around the perimeter of the speaker grill 310, regardless of any dielectric loading of the speaker grill 310, the RF EM waves emitted by the excitation of the speaker grill 310 may be 2 GHz in a spectrum mapping with certain RF LTE bands such as band 1, band 2, band 4, band 66, band 25, band 34, and band 39. In an embodiment where the length of the slot is 160 mm around the perimeter of the speaker grill 310, regardless of any dielectric loading of the speaker grill 310, the speaker grill 310 may resonate at 900 MHz with a spectrum mapping with certain RF LTE bands such as band 5, band 8, and band 26. In an embodiment where the length of the slot is 30 mm around the perimeter of the speaker grill 310, regardless of any dielectric loading of the speaker grill 310, the speaker grill 310 may resonate at 5 GHz with a spectrum mapping with certain RF LTE bands such as band 48, and a portion of a 5G new radio (5GNR) sub 6 band of n79.

Figure 3D:
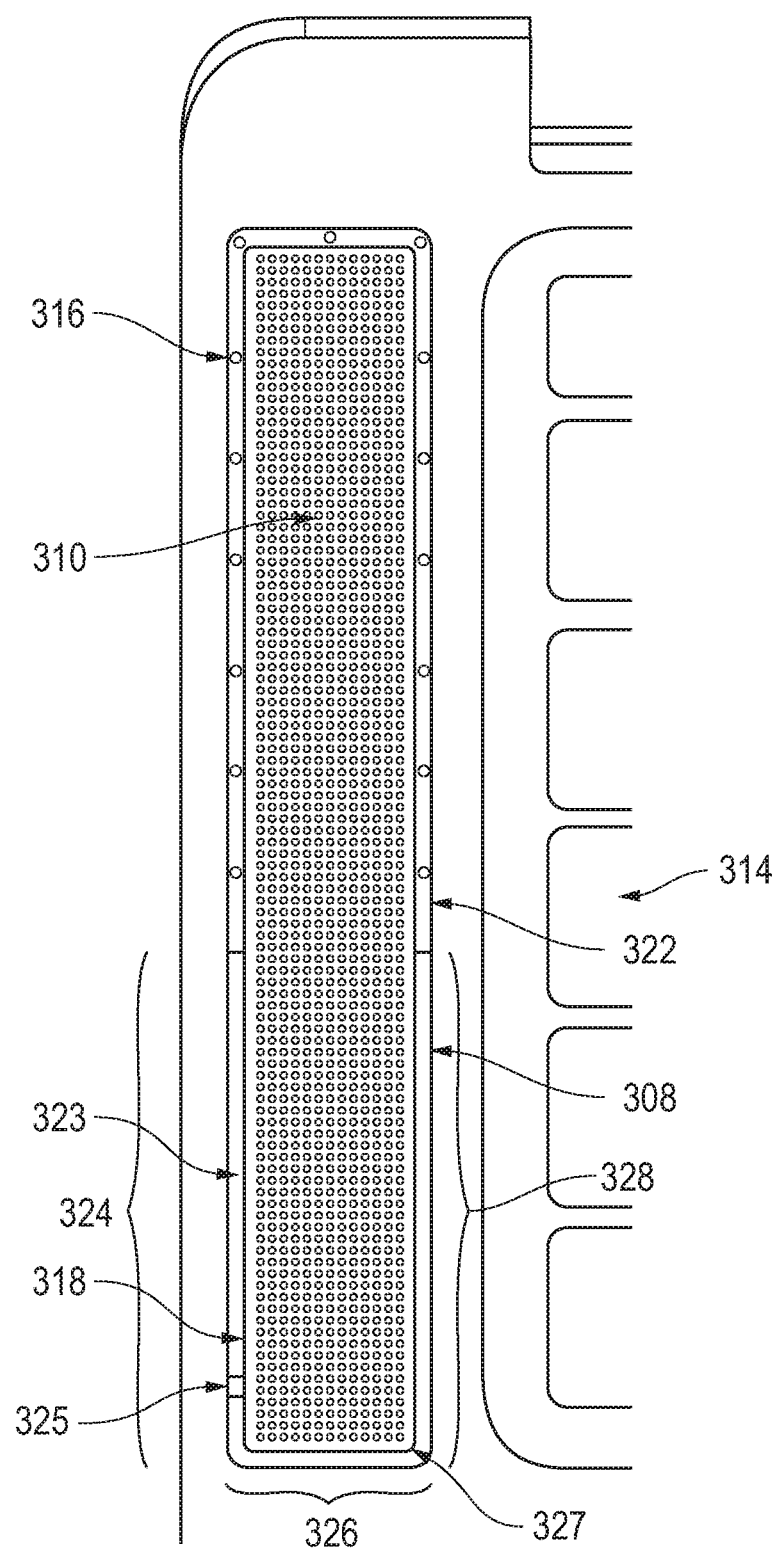
FIG. 3D is another top view of a graphical illustration of another speaker grill formed into a C-cover of an information handling system according to an embodiment of the present disclosure.

Additionally, although FIG. 3C shows a speaker grill 310 formed on a right side of the C-cover 308, the present specification contemplates that the speaker grill 310 or an additional speaker grills 310 may be formed on other edges or surfaces of the C-cover 308 such as shown in FIG. 3D. FIG. 3D is a graphical illustration of another speaker grill 310 formed into a C-cover of an information handling system according to an embodiment of the present disclosure. The speaker grill 310 shown in the FIG. 3D may be similar to some aspects of the speaker grill 310 shown in FIG. 3C. In the speaker grill 310 shown in FIG. 3D, a slot 318 may be formed around a partial perimeter of the speaker grill 310. The slot 318 may terminate at a trench 322 formed around a remaining portion of the perimeter of the speaker grill 310. In the embodiments presented herein, the slot 318 may include a shunt 325 that bifurcates the slot 318 into a first section 323 of the slot 318 and a second section 327 of the slot 318. In these embodiments, the shunt may be placed along a length of the slot 318 at any point so that an antenna element may create resonant RF EM waves that resonate according to the length of either of the first section 323 of the slot 318 and second section 327 of the slot 318. Thus, in this embodiment, the first section 323 of the slot 318 may thus be tuned to serve as an aperture that emits a first resonate frequency of RF EM waves while the second section 327 of the slot 318, either concurrently or selectively, may be tuned to serve as an aperture that emits a second resonate frequency of RF EM waves. In an embodiment where the length of the first section 323 of the slot is 45 mm around a portion of the perimeter of the speaker grill 310, regardless of any dielectric loading of the speaker grill 310, the RF EM waves emitted by the excitation of the speaker grill 310 may be 3.3 GHz in a spectrum mapping with certain RF LTE bands such as band 42, band 43, band 48, and a portion of a 5G new radio (5GNR) sub 6 band of n77 and n78. In an embodiment where the length of the second section 327 of the slot is 70 mm around the perimeter of the speaker grill 310, regardless of any dielectric loading of the speaker grill 310, the speaker grill 310 may resonate at 2 GHz with a spectrum mapping with certain RF LTE bands such as band 1, band 2, band 4, band 66, band 34, and band 39.

During assembly, a trim ring (not shown) may be formed into the slot 318 and trench 322 via compression molding, transfer molding, injection molding, or other types of plastic molding processes. The placement of the trim ring into the trench 322 and slot 318 prevents objects from passing through the slot 318 and into the C-cover 308 and D-cover 304 assembly. Additionally, the trim ring may be formed to be level with a surface of the C-cover 308. The trim ring may, therefor, appear to a user to be an accentuating feature of the information handling system while hiding the slot 318 and trench 322 of the speaker grill 310 while still enabling emissions of RF EM waves. Because the plastic trim ring is RF transparent, the RF EM wave may be propagated away from the information handling system.

The trench 322 and slot 318 may also include an undercut formed one or both of the sides of the trench 322 and slot 318. The undercut may prevent the vertical movement out of the trim ring 312 so that the trim ring 312 remains in the slot 318 and trench 322. By securing the trim ring 312 via use of the undercut, the trim ring 312 may not be removed by the user thereby preventing damage to the components of the information handling system if objects were to be passed through the slot 318. FIG. 3D also shows at least one interlocking hole 316 that also prevents the trim ring 312 from moving horizontally within the trench 322. Again, this prevents the removal of the plastic trim ring 312 by the user from the trench 322. During assembly, the plastic of the plastic trim ring 312 may be compressed into the interlocking hole 316 and undercut so that there is a locking fit between the trim ring 312 and the speaker grill 310 and C-cover 308. In an embodiment, the plastic trim ring may be formed into the slot 318 and trench 322 using nano-molding technology (NMT). In this embodiment, the metal of the C-cover 308 may be directly bonded to the plastic trim ring by creating the slot 318 and trench 322 as well as the undercut by, for example, acid etching those structures. The NMT may, once the slot 318, trench 322, and undercut are acid-etched, continue with molding the plastic trim ring into the slot 318 and trench 322 using compression molding, transfer molding, injection molding, or other types of plastic molding processes.

FIG. 3D shows a slot 318 that is relatively shorter than that slot shown in FIG. 3C. In an embodiment, the slot 318 may have a first length 324, second length 326, and third length 328. Thus, the slot 318 may be formed around three edges of the speaker grill 310 creating a peninsula of metal of the speaker grill 310 with the shunt 325 bifurcating the slot 318. In an embodiment, the length of the first length 324 is between 20 mm and 40 mm. The length of the first length 324 may be chosen to tune the speaker grill 310 to emit a certain RF EM wave such as those used in cellular networks or other computer networks as described herein.

In any embodiment described herein including those shown in FIGS. 3C and 3D, the width of the slot 318 may be 1.5 mm. Again, along with the length of the slot 318, the width (e.g., 1.5 mm) of the slot 318 may be selected so that a specific RF EM wave may be emitted by the speaker grill 310. Still further, any width of the slot 318 may be selected to not only physically separate a portion of the speaker grill 310 from the C-cover 308 but also operatively separate the portion of the speaker grill 310 from the C-cover 308 such that a sufficient transmission aperture is formed. The portion of the speaker grill 310 may be operatively separated from the C-cover 308 such that the RF EM wave emissions from the sides of the speaker grill 310 may propagate without interference from the metal of the C-cover 308. Consequently, in any embodiment presented herein, the width of the slot 318 may be at least wide enough to allow such propagation.

As described herein, the speaker grill 310 may also have an antenna element placed behind a backside of the speaker grill 310. The antenna element may be formed to have a first tine and a second tine with the second tine being grounded to the speaker grill 310 so that the second tine may allow for multiple frequency bands to be emitted by the antenna element. The antenna element is described further in embodiments herein.

Figure 3E:
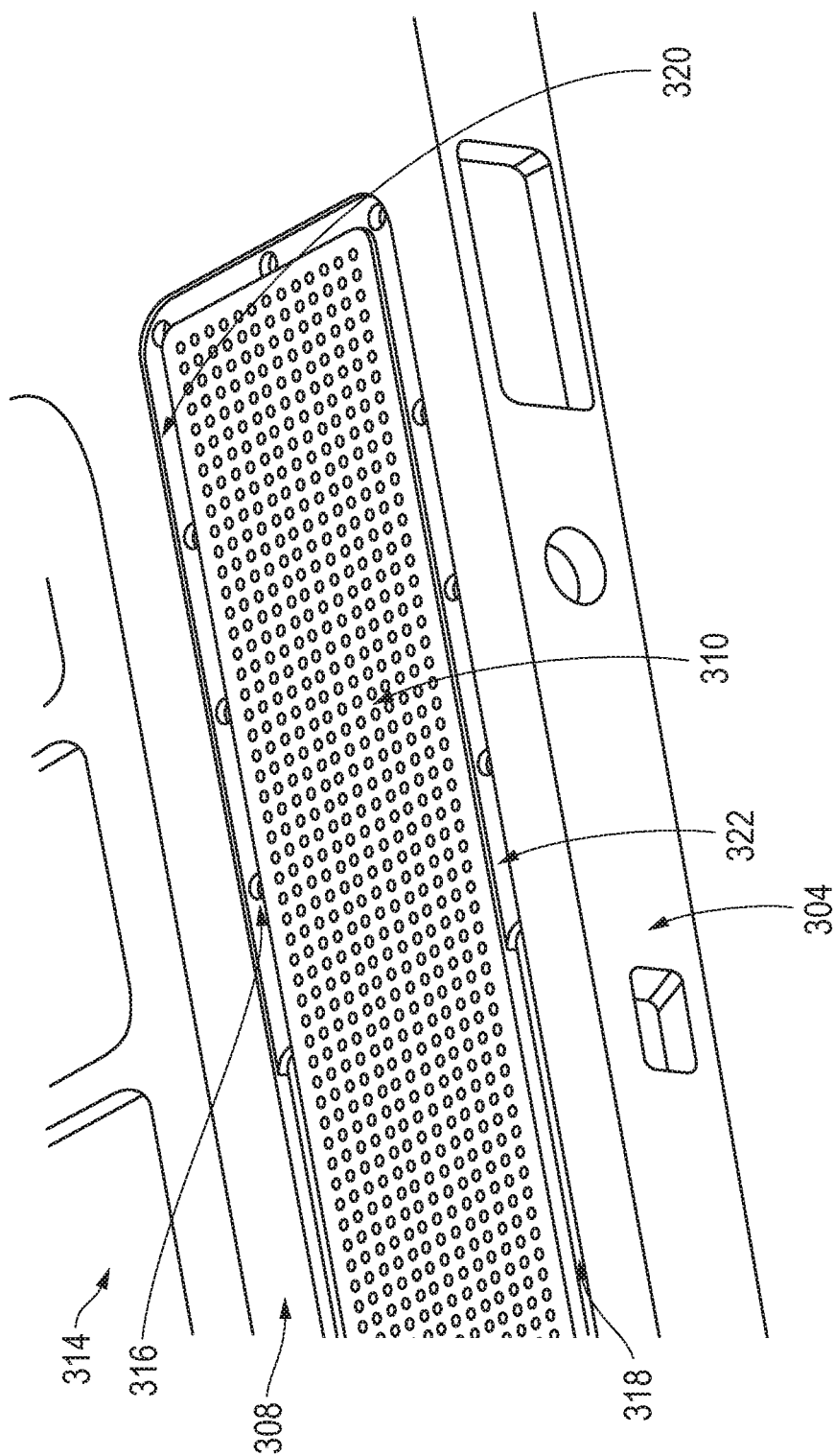
FIG. 3E is a perspective graphical illustration of a speaker grill formed into a C-cover of an information handling system according to another embodiment of the present disclosure.

FIG. 3E is a perspective graphical illustration of a speaker grill 310 formed into a C-cover 308 of an information handling system according to another embodiment of the present disclosure. FIG. 3E shows the details of the undercut 320 formed into the trench 322. Although FIG. 3E does not show the undercut formed into the slot 318, the present specification contemplates that the undercut 320 is also formed into the slot 318 so as to also retain the trim ring 312 within that portion of the perimeter of the speaker grill 310.

Also shown in FIG. 3E are the interlocking holes 316 of which, in this example, there are nine. Although FIG. 3E shows nine interlocking holes 316 being formed within the trench 322, the present specification contemplates that there may be more or less than nine interlocking holes 316 and FIG. 3E is merely an example. The interlocking holes 316 may be filled with the plastic used to form the plastic trim ring during an NMT process as described herein. During this process the plastic used to form the trim ring may be pressed into the interlocking holes 316 as well as the undercut 320 and allowed to solidify. After solidification of the plastic, the trim ring is prevented from moving within or out of the slot 318 and trench 322: the undercut 320 preventing vertical movement of the trim ring away from the surface of the C-cover 308 and the interlocking holes 316 preventing movement of the trim ring horizontally. Thus, during use, a user is prevented from removing the trim ring thereby potentially compromising the electrical and mechanical devices placed within the C-cover 308 and D-cover 304 assembly.

The speaker grill 310 may have a number of holes defined therein. These holes may allow sound waves from a speaker to pass through. In an embodiment, the speaker may be placed below the speaker grill 310. In a specific embodiment, the speaker may be placed under a portion of the speaker grill 310 at a location away from the antenna element. In an embodiment, the speaker is placed below the speaker grill 310 in a location where the speaker grill 310 is coupled to the C-cover 308 such as under the side with trench 322, and not where the slot 318 has been formed around the speaker grill 310.

Figure 4A:
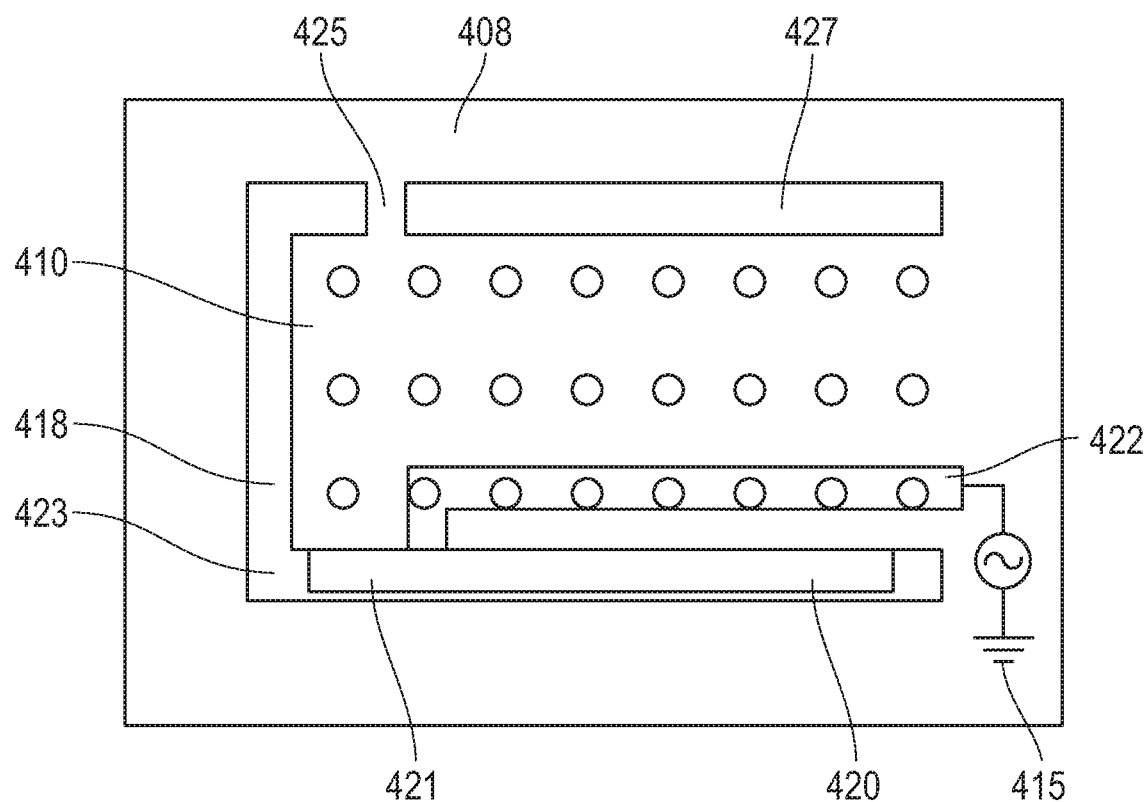
FIG. 4A is a block diagram of a speaker grill and an antenna element according to an embodiment of the present disclosure.

FIG. 4A is a block diagram of a speaker grill 410 and an antenna element 420 according to an embodiment of the present disclosure. The size and shape of the speaker grill 410 shown in FIG. 4A is merely an example, and any sizes of the elements described herein may be altered according to the principles described herein.

The speaker grill 410 may be formed within a portion of the C-cover 408 of an information handling system described herein. Although FIG. 4A shows a single speaker grill 410, the present description contemplates that multiple speaker grills 410 being formed within the C-cover 408. By forming multiple speaker grills 410 within the C-cover 408, the audio and communication abilities of the information handling system may be increased. With multiple speaker grills 410, the audio output of the information handling system may be increased with the additional audio output and tonal frequencies of speakers associated with each of the speaker grills 410. Additionally, each of the speaker grills 410 may include its own antenna element 420 with each antenna element 420 and speaker grill 410 assembly tuned to emit one or more different frequencies in tandem or concurrently. This increases the ability of the information handling system to communicate with different computer or cellular networks and, in some embodiments, communicate with those networks concurrently. In the embodiments presented herein, the frequencies may include 5G frequencies as described herein and may vary depending on jurisdiction as to available frequency bands in millimeter wave band frequency, among others.

As described herein, a slot 418 may be formed around a portion of the speaker grill 410. In the embodiment, the slot 418 is formed around a lower portion of the speaker grill 410 forming a peninsula on the speaker grill 410. Instead of a continuous slot 418 being formed around the speaker grill 410, the slot 418 may be bifurcated by a shunt 425 in some embodiments. The shunt 426 physically couples the speaker grill 410 to the C-cover 408 at a location along the slot 418. The term "bifurcate", therefore, is meant to understood as the division of the slot 418 into two or more sections. In the embodiments described in FIG. 4A and herein, the shunt 426 separates the slot 418 into a first section 423 of the slot 418 and a second section 427 of the slot 418. In an embodiment, the first and second sections 423 and 427 of the slot 418 are of equal length. In an embodiment, the first and second sections 423 and 427 may be of different lengths. The individual lengths of the first and second sections 423 and 427 of the slot 418 may be chosen based on a target frequency or frequencies to be emitted by the antenna element 420 as described herein.

The antenna element 420 may be any electrically conductive material that receives a current at a target voltage so as to emit RF EM waves therefrom. As shown in FIG. 4A, the antenna element 420 is forked and branches off to form a first tine 421 and a second tine 422. The first tine 421 of the antenna element 420 may be placed to align with the first section 423 of the slot 418 formed around the speaker grill 410. The first tine of the antenna element 420 lines up with the slot 418 length and width in order to support, for example, a 5G FR1 multiple-input multiple-output (MIMO) frequency. These 5G FR1 frequencies include sub-6 GHz frequency bands, some of which are frequency bands used by previous standards, but may also be extended to cover potential new spectrum offerings from 410 MHz to 7125 MHz. The first tine of the antenna element 420 may, in an embodiment, interact with the first section 423 of the slot 418 as an aperture thereby causing the antenna element 420 to act as an aperture antenna that, additionally, implements resonance frequencies created by the antenna element 420 to increase the power of the RF EM waves produced by the antenna element 420.

The antenna element 420 also includes a second tine 422 that, in an embodiment, branches off of the first tine 421. As shown in FIG. 4A this second tine 422 of the antenna element 420 is placed below the speaker grill 410 and parallel to the first section 423 of the slot 418. The emission of RF EM waves from the second tine 422 of the antenna element 420 may be of a higher-order frequencies than that produced by the first tine 421 of the antenna element 420. In an embodiment, the second tine 422 is placed, using a support structure, at a distance further away from the speaker grill 410 than that of the first tine 421. In an embodiment, the distance from speaker grill 410 and second tine 422 causes capacitance allowing for relatively higher-order frequencies to be emitted by the antenna element 420 and its second tine 422. In an embodiment, these higher-order frequencies may be emitted at an edge of the speaker grill 410 where the second portion 427 of the slot 418 is located via a cavity formed under the speaker grill 410.

In an embodiment, a distal end of the second tine 422 of the antenna element 420 may be tied to ground 415. Without the ground 415, the antenna element 420 may not be capable of achieving the higher-order frequencies as described. In the embodiment shown in FIG. 4A, however, the ground 415 may effectively split the antenna element 420 into two resonant frequency operations: a first operational frequency coupling better with the first portion 423 of the slot 418 when resonated at that frequency and the other, relatively higher-order frequency, being operationally coupled to the second portion 427 of the slot 418. During operation, an antenna front end may excite the antenna element 420 using a plurality of current and voltage settings to create, at least, at the first and second resonance frequencies at the antenna element 420 to operationally couple to the first and second sections 423 and 427 of the slot 418 as described herein. Other emitted frequencies may also be realized at the antenna element 420 such as harmonics of the first and second resonant frequencies or other frequencies that are tuned by the front end at the antenna element 420.

Figure 4B:
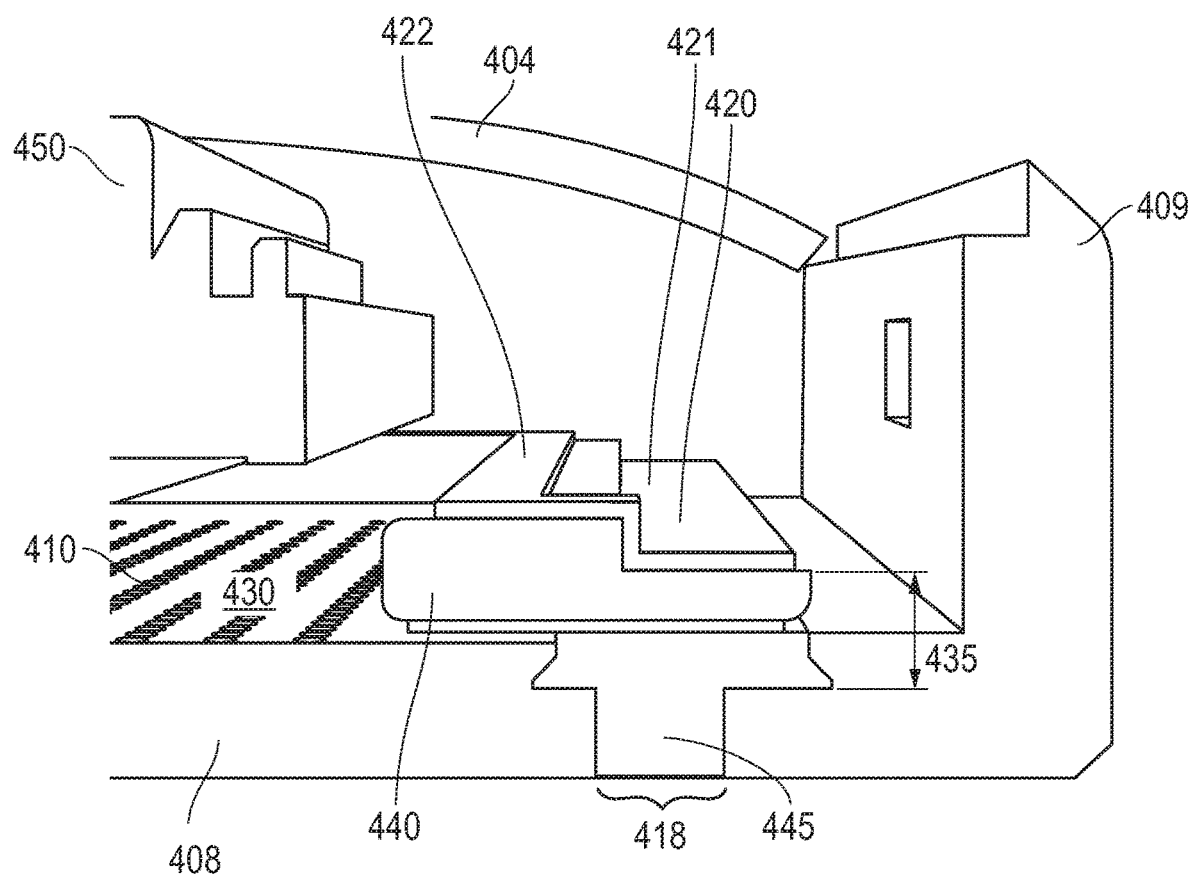
FIG. 4B is a cross cut graphical diagram of a speaker grill and antenna system according to an embodiment of the present disclosure.

FIG. 4B is a cross cut graphical diagram of the speaker grill 410 according to an embodiment of the present disclosure. FIG. 4B shows the speaker grill 410 and C-cover 408 facing down while a cavity behind the speaker grill 410 is shown with a portion of the D-cover 404 being shown at a bottom of the information handling system the speaker grill 410 is formed in. In an embodiment, a side wall 409 is part of the C-cover 408. In other embodiments, the side wall 409 may be part of the D-cover 404.

In an embodiment, the speaker grill 410 may be physically associated with a speaker 450. The speaker 450 may be any type of electroacoustic transducer that converts electrical audio signals from a processor into a corresponding sound. Any number of devices including amplifiers, magnets, diaphragms, and coils may be used to produce this audio at the speaker 450. The size of the speaker 450 may vary depending on the band of audio frequencies to be emitted therefrom as well as the size of the speaker grill 410 and a cavity formed behind the speaker grill 410. In order to pass this audio output to the user's ears, the speaker grill 410 may have a number of holes through which the audio output created by the speaker 450 and, in an embodiment, altered by the cavity may pass. A speaker cavity behind the speaker grill 410 is further used to enhance any audio emitted by the speaker and may also house the antenna element 420.

Co-located with the speaker 450, the information handling system includes an antenna element 420. The antenna element 420 may be forked to include a first tine 421 and a second tine 422 as described in connection with FIG. 4A. In the embodiment shown in FIG. 4B, the first tine 421 may be placed at a distance 435 closer to the speaker grill 410 than the distance 430 of the second tine 422 relative to the speaker grill 410. In an embodiment, the distance 435 of the first tine 421 of the antenna element 420 relative to the speaker grill 410 may be between 0.8 and 1.8 mm. In an embodiment, the distance of the first tine 421 of the antenna element 420 relative to the speaker grill 410 may be 1.3 mm. In an embodiment, the distance of the second tine 422 of the antenna element 420 relative to the speaker grill 410 may be between 0.5 mm and 2.0 mm. In an embodiment, the distance of the second tine 422 of the antenna element 420 relative to the speaker grill 410 may be 1.5 mm. In these embodiments, the distances of the first tine 421 and second tine 422 of the antenna element 420 from the speaker grill 410 may maintained at their respective distances by placing the antenna element 420 on an antenna support structure 440. The antenna support structure 440 may be any material that is sufficiently resilient to maintain the antenna element 420 and its respective tines 421 and 422 at a distance from the speaker grill 410. In an embodiment, the antenna support structure 440 is made of a RF transparent material such as a plastic.

In an embodiment, the speaker grill 410 may be physically and operatively uncoupled form the C-cover 408 by the formation of a slot 418 around the speaker grill 410. As described herein, a shunt (not shown in FIG. 4B) may bifurcate this slot 418 formed. During use of the information handling system, the slot 418 may be exposed allowing objects to pass through the slot 418. In order to prevent this, an RF transparent trim ring 445 may be formed within the slot 418. In an embodiment, the trim ring 445 is held within the slot 418 by use of the undercuts and interlocking holes described in connection with FIG. 3C.

In an embodiment, the speaker 450 and antenna element 420 along with a number of other electrical and mechanical components of the information handling system may be enclosed within the C-cover 408 and a D-cover 404. When assembled, the C-cover 408 and D-cover 404 may be coupled to a A-cover and B-cover assembly forming the information handling system described herein.

Figure 4C:
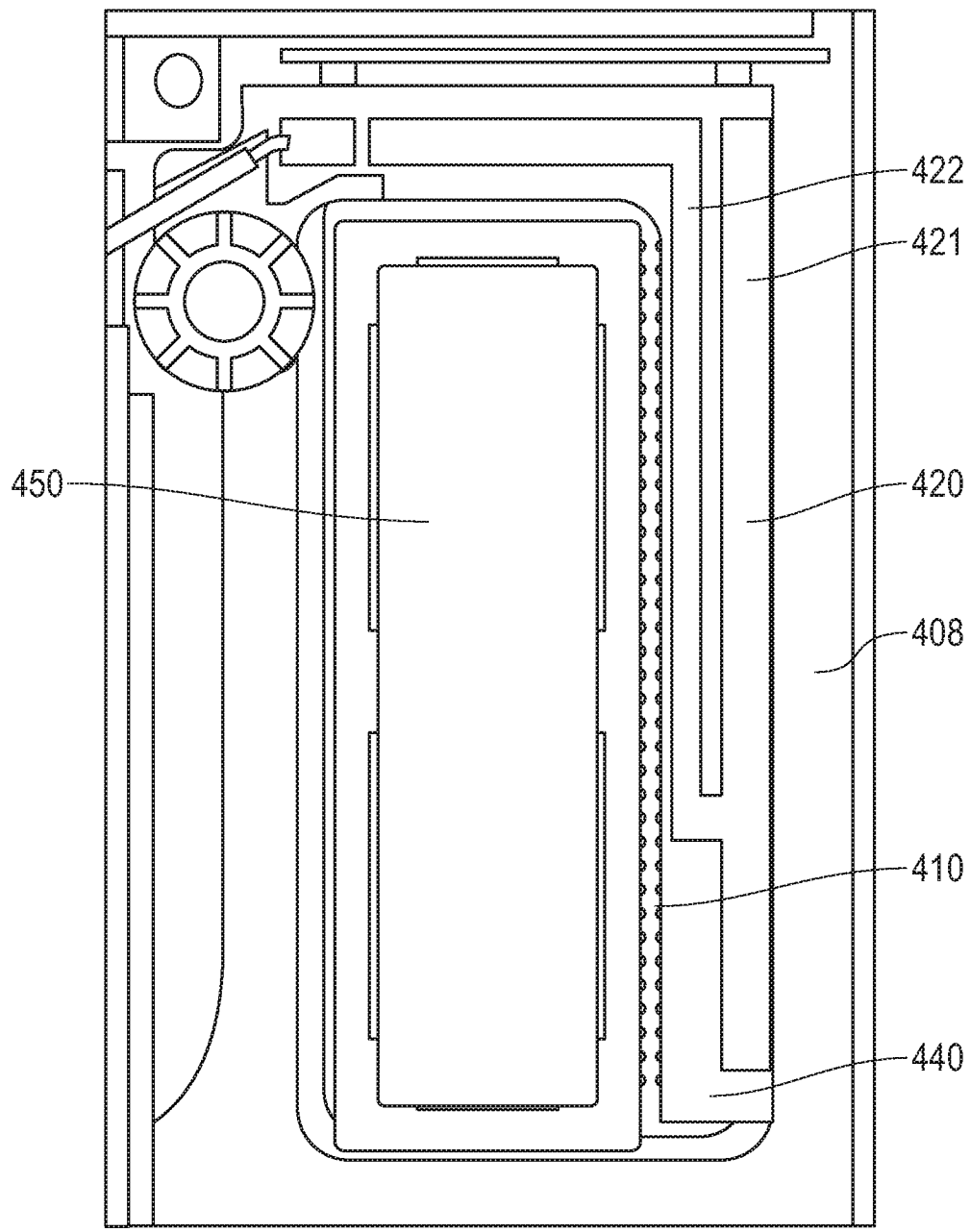
FIG. 4C is a block diagram of a speaker grill with an antenna element according to an embodiment of the present disclosure.
Figure 4D:
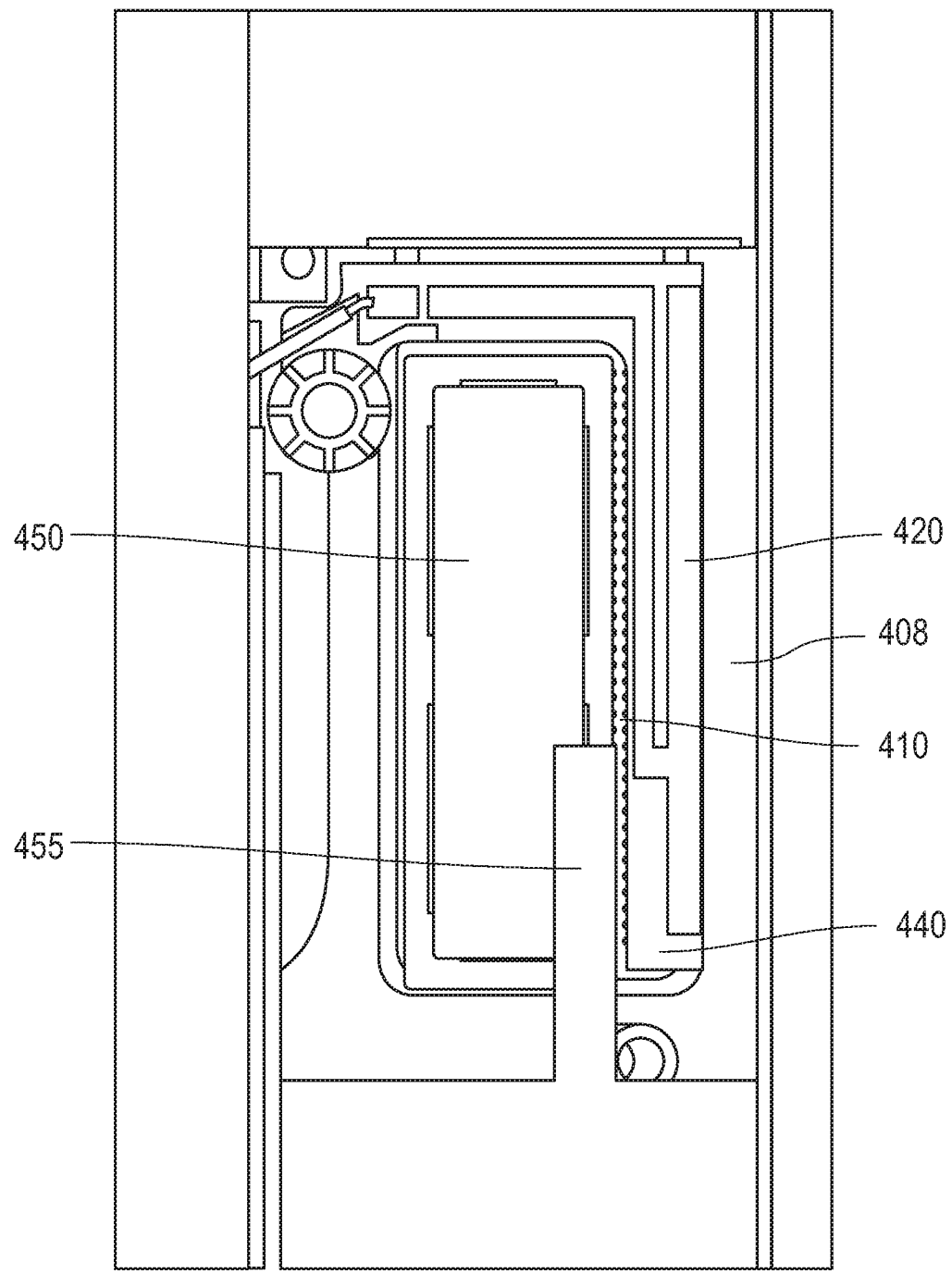
FIG. 4D is a block diagram of the antenna element and speaker grill of the with a parasitic element portion according to an embodiment of the present disclosure.

FIG. 4C is a block diagram of a speaker grill 410 with an antenna element 420 according to an embodiment of the present disclosure. FIG. 4D is a block diagram of the antenna element 420 and speaker grill 410 with a parasitic element 455 portion of a D-cover according to an embodiment of the present disclosure. FIG. 4C shows a speaker 450 placed behind the speaker grill 410 at a location off-set from that of an antenna element 420. As described herein, the speaker 450 may be any device the receives a signal from a processor of the information handling system and produces audio as output to the user. This output may be any type of audio including music and notification sounds. As described herein, the speaker 450 may be co-located with the antenna element 420 and speaker grill 410 in order to decrease the footprint of the speaker and antenna systems consumed within the information handling system.

FIG. 4C also shows an antenna support structure 440 that supports the antenna element 420. The antenna support structure 440 may be any material that is sufficiently resilient to maintain the antenna element 420 and, in an embodiment, its respective tines 421 and 422 at a distance from the speaker grill 410. In an embodiment, the antenna support structure 440 is made of a RF transparent material such as a plastic.

FIG. 4D shows, in addition to the antenna element 420, the speaker grill 410, and the speaker 450, a parasitic element 455. During assembly of the information handling system, a D-cover 404 may be added to the C-cover 408 according to an example of the principles described herein. The D-cover 404 may have the parasitic element 455 formed thereon. The parasitic element 455 may co-couple with the first section of the slot 418 to enhance the bandwidth across the higher-order frequencies. In an embodiment, the parasitic element 455 may be used to affect the resonance of the RF EM waves produced by the antenna element 420.

Figure 4E:
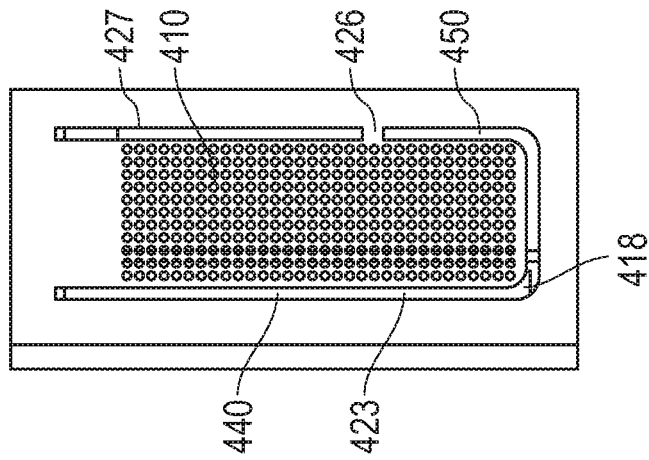
FIG. 4E is a diagram showing a top view of a speaker grill and shunt at a position along the slot according to an embodiment of the present disclosure.
Figure 4F:
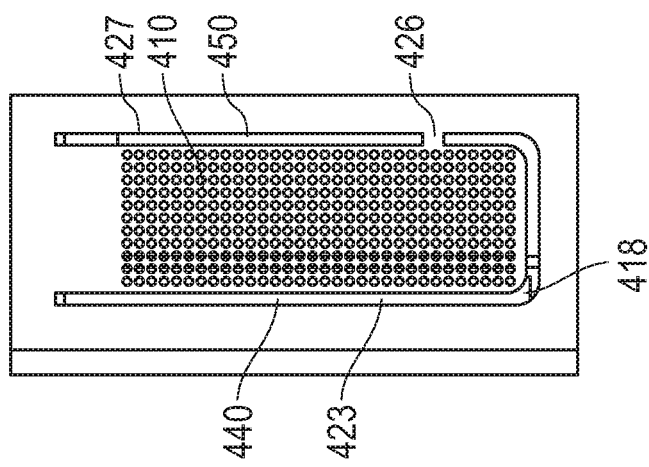
FIG. 4F is a diagram showing a top view of a speaker grill and shunt at a position along the slot according to another embodiment of the present disclosure.
Figure 4G:
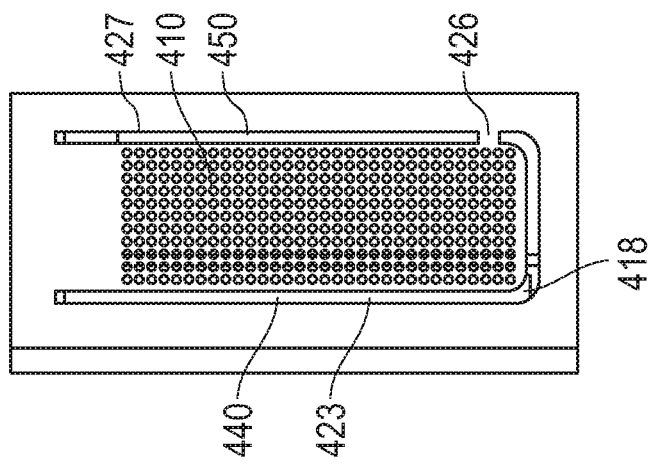
FIG. 4G is a diagram showing a top view of a speaker grill and shunt at a position along the slot according to another embodiment of the present disclosure.

FIG. 4E is a diagram showing a top view of a speaker grill 410 and shunt 426 at a position along the slot 418 according to an embodiment of the present disclosure. FIG. 4F is another diagram showing a top view of a speaker grill 410 and shunt 426 at a position along the slot 418 according to an embodiment of the present disclosure. FIG. 4G is yet another diagram showing a top view of a speaker grill 410 and shunt 426 at a position along the slot 418 according to an embodiment of the present disclosure. These three embodiments shown in FIGS. 4E, 4F and 4G each show that the shunt 426 may be placed along the slot 418 at any distance in order to partition the frequency modes produced by the antenna element 420 described herein. The placement of the shunt 426 may produce various frequencies when a certain voltage standing wave ratio (VSWR) is achieved at the antenna element 420.

In the embodiments presented herein, the shunt 426 may bifurcate the slot 418 into a first portion 423 and a second portion 427. The first portion 423 may line up with a first tine (not shown) of the antenna element with the slot 418 length and width in order to support, for example, a 5G FR1 multiple-input multiple-output (MIMO) frequency. These 5G FR1 frequencies include sub-6 GHz frequency bands, some of which are frequency bands used by previous standards, but may also be extended to cover potential new spectrum offerings from 410 MHz to 7125 MHz. The first tine of the antenna element 420 may, in an embodiment, interact with the first section 423 of the slot 418 as an aperture thereby causing the antenna element 420 to act as an aperture antenna that, additionally, implements resonance frequencies created by the antenna element 420 to increase the power of the RF EM waves produced by the antenna element 420. The second portion 427 may be operatively coupled to a second tine of the antenna element in order to resonate at a frequency that is relatively higher-order frequency than that produced by the first section 423 and first tine by being operationally coupled to the second portion 427 of the slot 418.

Each of FIGS. 4E, 4F, and 4G show a speaker 450 placed behind the speaker grill 410 at a location off-set from that of an antenna element (not shown). As described herein, the speaker 450 may be any device the receives a signal from a processor of the information handling system and produces audio as output to the user. This output may be any type of audio including music and notification sounds. As described herein, the speaker 450 may be co-located with the antenna element and speaker grill 410 in order to decrease the footprint of the speaker and antenna systems consumed within the information handling system.

Each of FIGS. 4E, 4F, and 4G also shows an antenna support structure 440 that supports the antenna element placed, in these views, behind the antenna support structure 440. The antenna support structure 440 may be any material that is sufficiently resilient to maintain the antenna element and, in an embodiment, its first and second tines at a distance from the speaker grill 410. In an embodiment, the antenna support structure 440 is made of a RF transparent material such as a plastic.

In each of FIGS. 4E-4G, a speaker wire may be passed across the shunt 426 according to an embodiment of the present disclosure. As described, the speaker grill 410 may house a speaker 450 that provides audio output to a user. In order to drive the components of the speaker 450, the speaker 450 may be coupled electrically to a processor and a power source. However, interactions with the speaker wire and the antenna element 420 may cause the excitation of the antenna element 420 to fail by introducing an EM filed produced by the speaker wire. In order to prevent this from occurring, the speaker wire may be passed from the speaker 450, across the shunt 426 and to the processor and/or power source so as to ground any excitation EM fields at the shunt 426 rather than anywhere by the antenna element 420. As a consequence, the shunt 426 not only provides for the bifurcation of the slot 418 in order to emit both low and high frequency RF EM waves, but also to ground any EM fields produced by a speaker wire or any other wire that passes through the cavity housing the antenna element 420.

Figure 4H:
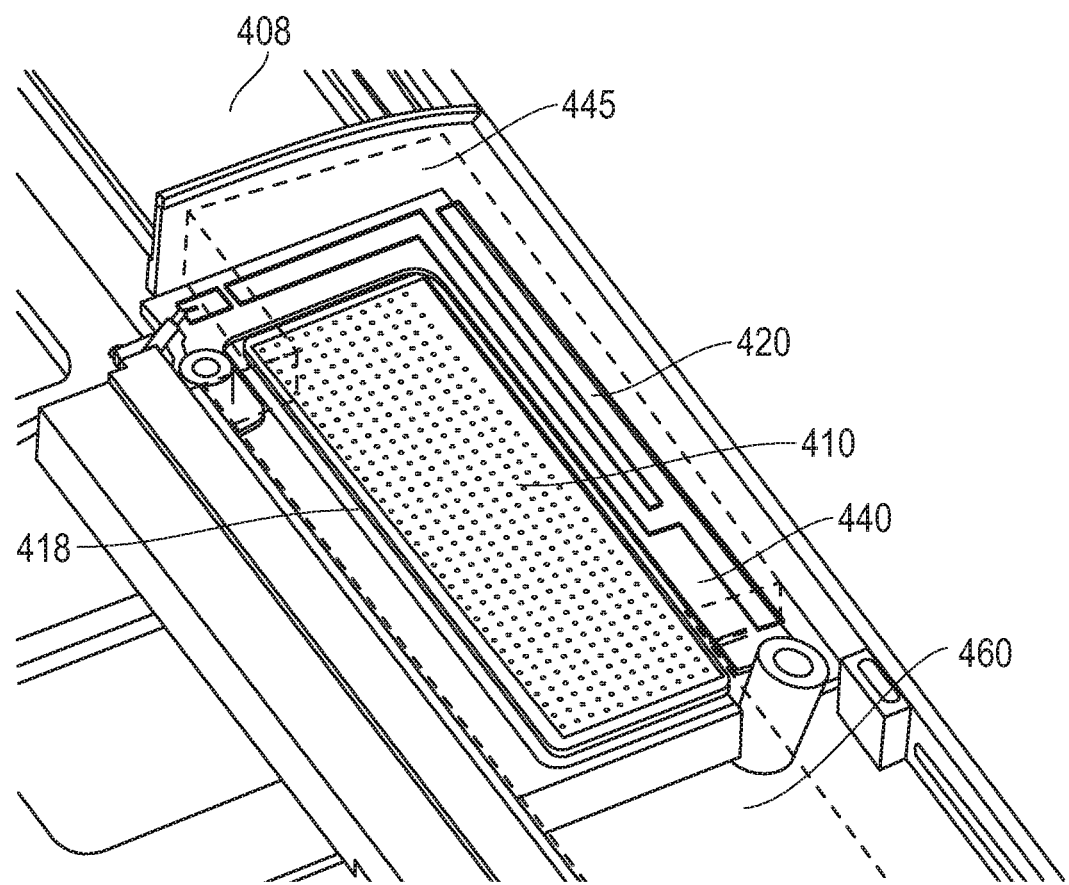
FIG. 4H is a perspective diagram showing a view of a C-cover from underneath according to an embodiment of the present disclosure.

FIG. 4H is a perspective diagram showing a view of a C-cover from underneath according to an embodiment of the present disclosure. In an embodiment, a cavity 460 is formed behind the antenna element 420. The cavity 460 may be partitioned using a number of partitioning walls, such as 445, that include the C-cover 408 or D-cover as well as vertical walls 445 formed vertically between the C-cover 408 and D-cover. In an embodiment, a frequency of RF EM waves resonated within the cavity 460 may be increased when the volume of the cavity 460 is increased. Similarly, a frequency of RF EM waves resonated within the cavity 460 may be decreased when the volume of the cavity 460 is decreased. As such, the volume of the cavity 460 may be created so that a target frequency or harmonics thereof may resonate within the cavity 460 and out via slot 418 in speaker grill 410. The cavity 460 also serves as an acoustic cavity for the speaker that is placed within the cavity 460 during assembly.

In an embodiment, the cavity 460 may also amplify or alter the characteristics of the audio waves produced by the speaker placed behind the speaker grill 410. As such, the cavity 460 may serve a dual purpose: as a resonant cavity as described herein relative to any RF EM waves produced by the antenna element and as an audio cavity to alter the acoustic properties of the audio produced by the speaker 450.

FIG. 4H also shows an antenna support structure 440. The antenna support structure 440 may be any material that is sufficiently resilient to maintain the antenna element and its respective tines and at a distance from the speaker grill 410. In an embodiment, the antenna support structure 440 is made of a RF transparent material such as a plastic.

Figure 5:
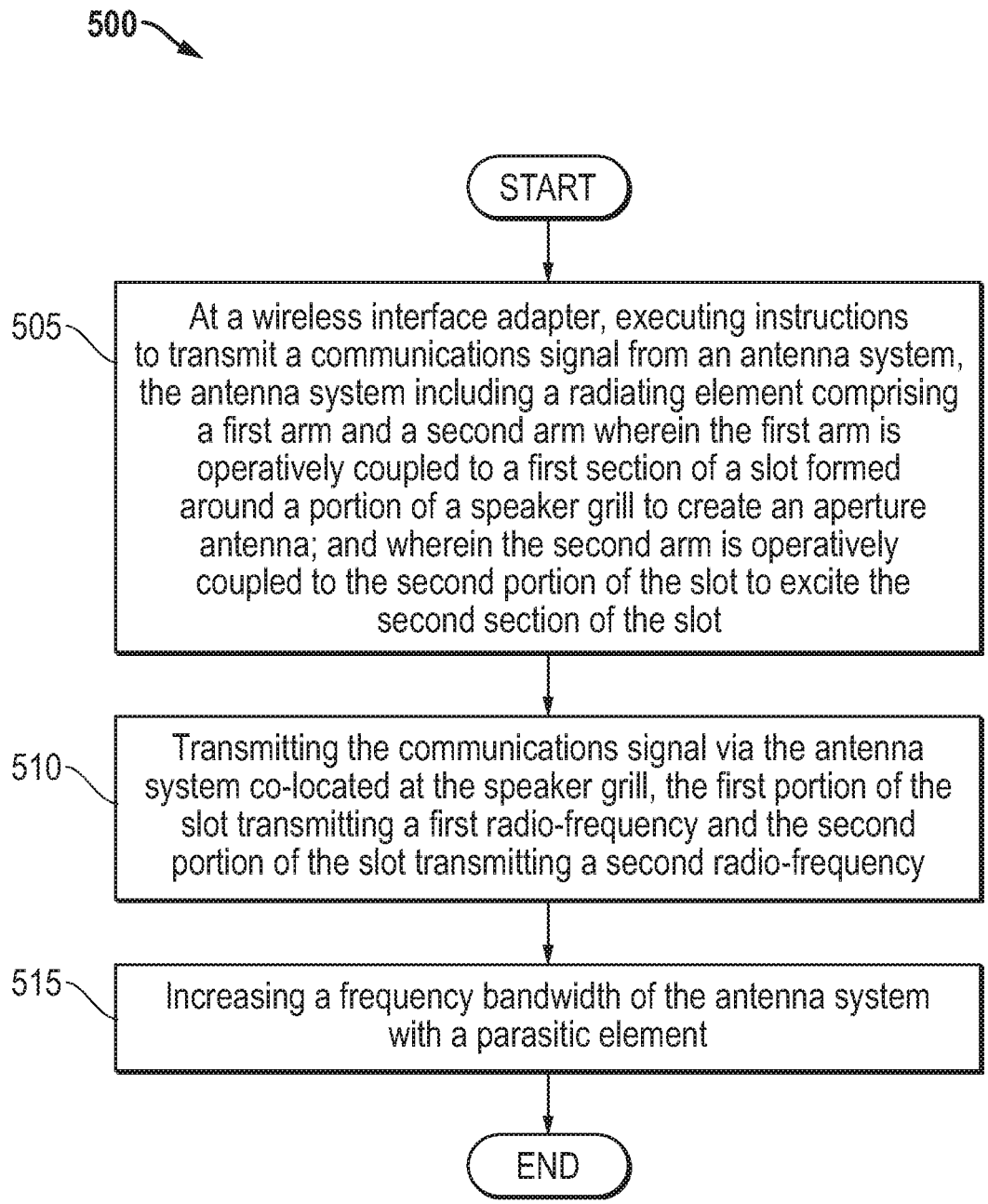
FIG. 5 is a flow diagram illustrating a method for operating an information handling system according to an embodiment of the present disclosure.

FIG. 5 is a flow diagram illustrating a method 500 for operating an information handling system according to an embodiment of the present disclosure. The method 500 may include, at a wireless interface adapter, executing, at block 505, instructions to transmit a communications signal from an antenna system. In the embodiments presented herein, the antenna system includes a radiating element comprising a first tine and a second tine. The first tine is operatively coupled to a first section of a slot formed around a portion of a speaker grill to create an aperture antenna while the second tine is operatively coupled to the second portion of the slot to excite the second section of the slot, according to an embodiment described herein.

As described herein, the operative coupling of the first tine to the first section of the slot and the second tine to the second section of the slot may be accomplished by placing the first tine closer to the speaker grill than the second tine is to the speaker grill. As the distance between the first tine relative to the speaker grill and the second tine relative to the speaker grill increases, the electrical impedance is also increased. A lower impedance experienced by the first tine relative to the first portion of the slot causes the first tine to be coupled to the first portion. In an embodiment the RF EM waves emitted by the first tine may include certain RF LTE bands such as band 1, band 2, band 3, band 4, and band 66 as well as some 5GNR Sub-6 bands. In an embodiment the RF EM waves emitted by the second tine may include certain RF LTE bands such as band 7, band 30, band 40, band 41, and band 38 as well as some 5GNR Sub-6 bands.

As described herein, the formation of the slot may allow objects to pass through the surface of the C-cover an into the C-cover and D-cover assembly. In order to prevent this, the slot may be filled with an RF transparent material such as a plastic. In an embodiment, the plastic trim ring may be formed into the slot using nano-molding technology (NMT). In this embodiment, the metal of the C-cover may be directly bonded to the plastic trim ring by creating the slot as well as the undercut by, for example, acid etching those structures. The NMT may, once the slot and undercut are acid-etched, continue with molding the plastic trim ring into the slot and trench using compression molding, transfer molding, injection molding, or other types of plastic molding processes.

The method 500 may continue, at block 510, with transmitting the communications signal via the antenna system co-located at the speaker grill, the first portion of the slot transmitting a first radio-frequency and the second portion of the slot transmitting a second radio-frequency. As described herein, the resonant frequency created by one or both of the first and second tine of the antenna element may indicate which or both of the first and second portions of the slot radiate the target frequency. In an embodiment the RF EM waves emitted by the first tine may include certain RF LTE bands such as band 1, band 2, band 3, band 4, and band 66 as well as some 5GNR Sub-6 bands. In an embodiment the RF EM waves emitted by the second tine may include certain RF LTE bands such as band 7, band 30, band 40, band 41, and band 38 as well as some 5GNR Sub-6 bands. In an embodiment, in order to switch between frequencies to be emitted from the antenna element, an antenna adaptation controller may include circuitry used to alter the current and voltage applied to the antenna element and each of the first and second tines. The antenna adaptation controller may alter the current and voltage in order to alter the ratio of impedance to capacitive reactance at the antenna element and its tines, thereby altering the frequencies emitted.

The method 500 may also include, at block 515, increasing a frequency bandwidth of the antenna system with a parasitic element. In an embodiment, the D-cover may include the parasitic element. The parasitic element may co-couple with the first section of the slot to enhance the bandwidth across the higher-order frequencies. In an embodiment, the parasitic element may be used to affect the resonance of the RF EM waves produced by the antenna element. In an embodiment, the parasitic element may be induced to (e.g., coupled to) the parasitic element at a certain frequency based on the length of an arm of the parasitic element. By tuning the length of the arm of the parasitic element, a resonate frequency at the antenna element may be tuned. The structure and location of the parasitic arm may be selected based on whether other structures associated with the antenna element may cancel the induced current at the structure of parasitic arm. In an embodiment, the parasitic element may co-couple with the first section of the slot to enhance the bandwidth across the higher-order frequencies. In an embodiment, the parasitic element may be used to affect the resonance of the RF EM waves produced by the antenna element.

During the transmission of the communications signal at block 510, the antenna element may be excited to emit a target RF EM wave therefrom. In order to emit the RF EM signal, the speaker grill may include a slot formed around a portion of the perimeter of the speaker grill. The length of the first and second portions of the slot may be set so that a target frequency or set of target frequency bands is emitted as described herein. In an embodiment, the antenna system may operate on various communication frequency bands such as under IEEE 802.11a and IEEE 802.11g (i.e., medium frequency (MF) band, high frequency (HF) band, very high frequency (VHF) band, ultra-high frequency (VHF) band, L band, S band, C band, X band, $K_u$ band, K band, $K_a$ band, V band, W band, and millimeter wave bands) providing multiple band options for frequency channels.

Figure 6:
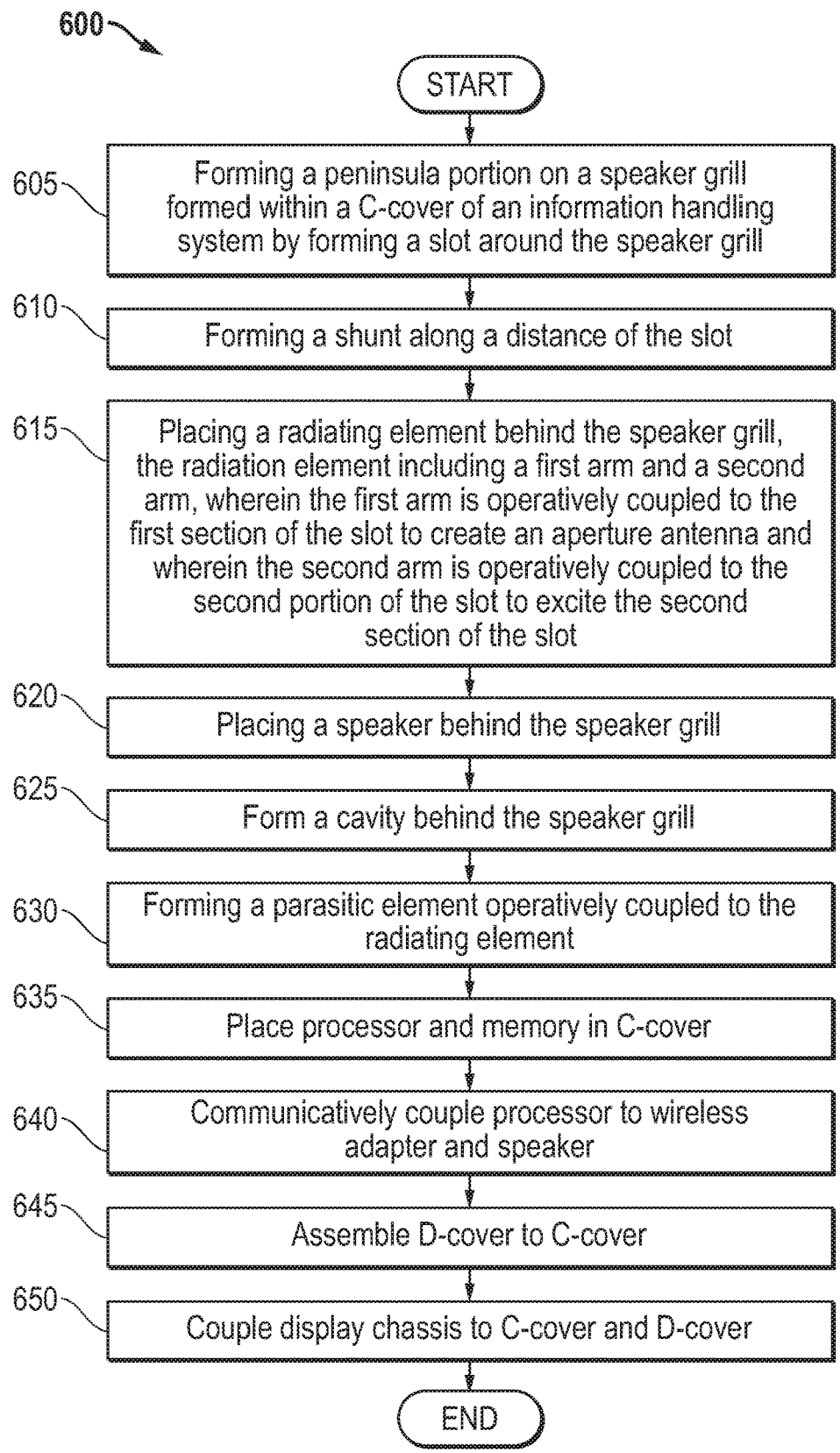
FIG. 6 is a flow diagram illustrating a method of assembling an information handling system according to an embodiment of the present disclosure.

FIG. 6 is a flow diagram illustrating a method 600 of assembling an information handling system according to an embodiment of the present disclosure. The method 600 may include, at block 605, forming a peninsula portion on a speaker grill formed within a C-cover of an information handling system by forming a slot around the speaker grill. As described herein the peninsula is formed by cutting or otherwise removing a portion of the C-cover along a portion of the perimeter of the speaker grill. This removal of the portion of the C-cover forms a slot between the portion of the speaker grill and the C-cover. According to an embodiment, a specific gap distance is created between the peninsula portion and the C-cover. This gap distance or slot width, in one example embodiment, may be 1.5 mm. Any width of the slot that may be sufficient for passage of RF EM waves may be used. In an embodiment, the length of the slot formed along a portion of the perimeter of the speaker grill may be such that a target frequency is emitted from the antenna system during operation of the antenna system may be realized. In an embodiment, the length of the slot may be 40 mm. In another embodiment, the length of the slot may be 70 mm. In an embodiment where the length of the slot is 70 mm around the perimeter of the speaker grill 310, regardless of any dielectric loading of the speaker grill 310, the RF EM waves emitted by the excitation of the speaker grill 310 may be 2 GHz in a spectrum mapping with certain RF LTE bands such as band 1, band 2, band 4, band 66, band 25, band 34, and band 39. In an embodiment where the length of the slot is 160 mm around the perimeter of the speaker grill 310, regardless of any dielectric loading of the speaker grill 310, the speaker grill 310 may resonate at 900 MHz with a spectrum mapping with certain RF LTE bands such as band 5, band 8, and band 26. In an embodiment where the length of the slot is 30 mm around the perimeter of the speaker grill 310, regardless of any dielectric loading of the speaker grill 310, the speaker grill 310 may resonate at 5 GHz with a spectrum mapping with certain RF LTE bands such as band 48, and a portion of a 5G new radio (5GNR) sub 6 band of n79.

The method 600 includes forming a shunt, at block 610, along a distance of the slot. As described herein, the shunt may serve a plurality of functions. As a first function, the shunt operatively separates the slot into a first section of the slot and a second section of the slot for the emission of distinct frequencies as described herein. As a second function, the shunt serves as a grounding location of any EM fields created by a speaker wire and as a via for the speaker wire to the speaker. In this embodiment, the speaker wire may exit the cavity housing the antenna element via the shunt so that the EM fields may not interfere with the operation of the antenna element. In the embodiments presented herein, the shunt may bifurcate the slot into a first portion and a second portion. The first portion may line up with a first tine of the antenna element with the slot length and width in order to support, for example, a 5G FR1 multiple-input multiple-output (MIMO) frequency. These 5G FR1 frequencies include sub-6 GHz frequency bands, some of which are frequency bands used by previous standards, but may also be extended to cover potential new spectrum offerings from 410 MHz to 7125 MHz. The first tine of the antenna element may, in an embodiment, interact with the first section of the slot as an aperture thereby causing the antenna element to act as an aperture antenna that, additionally, implements resonance frequencies created by the antenna element to increase the power of the RF EM waves produced by the antenna element. The second portion may be operatively coupled to a second tine of the antenna element in order to resonate at a frequency that is relatively higher-order frequency than that produced by the first section and first tine by being operationally coupled to the second portion of the slot.

The method 600 may further include, at block 615, placing a radiating element (i.e., the antenna element) behind the speaker grill, the radiation element including a first tine and a second tine. The radiating element's first tine is operatively coupled to the first section of the slot along the entire distance to the shunt formed therein to create an aperture antenna. In an embodiment, the first tine is physically aligned with the first section. The first tine of the antenna element lines up with the slot length and width in order to support, for example, a 5G FR1 multiple-input multiple-output (MIMO) frequency. These 5G FR1 frequencies include sub-6 GHz frequency bands, some of which are frequency bands used by previous standards, but may also be extended to cover potential new spectrum offerings from 410 MHz to 7125 MHz. The first tine of the antenna element may, in an embodiment, interact with the first section of the slot as an aperture thereby causing the antenna element to act as an aperture antenna that, additionally, implements resonance frequencies created by the antenna element to increase the power of the RF EM waves produced by the antenna element.

The antenna element also includes a second tine that, in an embodiment, branches off of the first tine. This second tine of the antenna element is placed below the speaker grill and parallel to the first section of the slot. In the embodiments presented herein, the second tine is operatively coupled to the speaker grill and an induced current from the second tine on the speaker grill may contribute to a frequency being resonated at second section of the slot. The emission of RF EM waves from the second tine of the antenna element may be of a higher-order frequencies than that produced by the first tine of the antenna element. In an embodiment, the second tine is placed, using a support structure, at a distance further away from the speaker grill than that of the first tine. This causes a higher inductance between the antenna element and the speaker grill allowing for the relatively higher-order frequencies to be emitted by the antenna element and its second tine. In an embodiment, these higher-order frequencies may be emitted at an edge of the speaker grill where the second portion of the slot is located via a cavity formed under the speaker grill.

In an embodiment, a distal end of the second tine of the antenna element may be tied to ground. Without the ground, the antenna element may not be capable of achieving the higher-order frequencies as described. In an embodiment, however, the ground may effectively split the antenna element into two resonant frequency operations: a first operational frequency coupling better with the first portion of the slot when resonated at that frequency and the other, relatively higher-order frequency, being operationally coupled to the second portion of the slot.

Additionally, in an embodiment, a resonant cavity may be created at the back of speaker grill may be used to resonate and direct the RF (RF) electromagnetic (EM) radiation up and away from the information handling system. In embodiments where the information handling system is to communicate with a wider network, the RF EM signals may be directed towards the horizon increasing the efficiency of data transmission between the information handling system and any access point.

The method 600 may include, at block 620, placing a speaker behind the speaker grill. The speaker may be any device the receives a signal from a processor of the information handling system and produces audio as output to the user. This output may be any type of audio including music and notification sounds. As described herein, the speaker may be co-located with the antenna element and speaker grill in order to decrease the footprint of the speaker and antenna systems consumed within the information handling system.

The method 600, at block 625, includes forming a cavity behind the speaker grill. The cavity may be partitioned using a number of partitioning walls that include the C-cover or D-cover as well as vertical walls formed vertically between the C-cover and D-cover. In an embodiment, a frequency of RF EM waves resonated within the cavity may be increased when the volume of the cavity is increased. Similarly, a frequency of RF EM waves resonated within the cavity may be decreased when the volume of the cavity is decreased. As such, the volume of the cavity may be created so that a target frequency or harmonics thereof may resonate within the cavity and out via slot in speaker grill. In an embodiment, the cavity also serves as an acoustic cavity for the speaker that is placed within the cavity during assembly.

The method 600, at block 630, may continue with forming a parasitic element operatively coupled to the radiating element. The parasitic element may co-couple with the first section of the slot to enhance the bandwidth across the higher-order frequencies. In an embodiment, the parasitic element may be used to affect the resonance of the RF EM waves produced by the antenna element.

The method 600 may include placing a processor and memory in the D-cover at block 635. The elements of the information handling system, as described herein, may be installed according to methods understood in the art including use of a motherboard and auxiliary boards where appropriate. The processor may be any type of processing device that executes instructions to, in an embodiment, control the application of a current to the radiating element (e.g., an antenna element or the speaker grill) at a certain voltage. In an embodiment, the memory is communicatively coupled to the processor so as to allow access to the memory by the processor upon execution of computer readable instructions as described herein.

The method 600, at block 640, may include communicatively coupling the processor to a wireless adapter and speaker. The wireless adapter can provide connectivity to a network, e.g., a wide area network (WAN), a local area network (LAN), wireless local area network (WLAN), a wireless personal area network (WPAN), a wireless wide area network (WWAN), or other network and operate in 5G frequency bands as described herein.

The method 600 may include, at block 645, assembling the D-cover to the C-cover. The assembly of the D-cover to the C-cover may form a base chassis that houses the processor, the wireless adapter, the speaker, the memory, among other components. In an embodiment, the base chassis formed may also include certain input devices such as a keyboard and a trackpad.

The method may also include, at block 650, coupling a display chassis to the C-cover and D-cover. The display chassis, in an embodiment, may include an A-cover and a B-cover that may house a display device used to provide output to a user of the information handling system. The method 600 may then end.

The blocks of flow diagram of FIGS. 5 and 6 discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system to wirelessly transmit and receive data comprising:
   a processor;
   a memory;
   a wireless adapter for transceiving wireless communications via radiofrequency (RF) waves;
   a metal C-cover to house a speaker grill, the speaker grill covering a speaker to emit audio waves;
   the speaker grill formed within the C-cover, the speaker grill comprising:
      a slot formed around a portion of a perimeter of the speaker grill that physically separates the portion of the speaker grill from the C-cover;
      a shunt formed at a distance along the slot creating a first portion of the slot and a second portion of the slot;
      a forked antenna element wherein:
         a first tine of the forked antenna is operatively coupled to the first portion of the slot to excite the first portion of the slot at a first resonance; and
         a second tine of the forked antenna, grounded to the speaker grill, is operatively coupled to the second portion of the slot to excite the second portion of the slot at a second resonance.

2. The information handling system of claim 1, wherein the first tine operates as an aperture antenna relative to the first portion of the slot.

3. The information handling system of claim 1, comprising a speaker wire to provide data signals and power to the speaker wherein the speaker wire passes across the shunt separating the first portion of the slot from the second portion of the slot.

4. The information handling system of claim 1, wherein the second tine of the forked antenna is grounded to the speaker grill.

5. The information handling system of claim 1, wherein the distance along the slot at which the shunt is placed is selected to size the first portion of the slot and second portion of the slot based on a one or more target radio frequencies to be emitted by the first tine of the forked antenna and the second tine of the forked antenna.

6. The information handling system of claim 1, wherein the first tine and the second tine are placed a different distances below the speaker grill inside surface.

7. The information handling system of claim 1, wherein the first tine and the second tine are placed at different distances from the speaker grill.

8. The information handling system of claim 1, comprising a cavity formed behind the speaker grill, wherein the cavity forms an audio cavity to alter characteristics of the audio waves and for a resonant cavity for resonance of RF EM waves produced by the forked antenna element.

9. A C-cover and D-cover assembly for an information handling system comprising:
a speaker grill made of metal and housed in the C-cover, the speaker grill covering an audio speaker;
a processor,
a memory,
a wireless adapter for transceiving wireless communications via radiofrequency (RF) waves;
a slot formed around a portion of the speaker grill and physically and operatively separating the speaker grill from the C-cover wherein the slot comprises a shunt formed at a distance along the slot creating a first section of the slot and a second section of the slot;
a radiating element comprising a first tine and a second tine:
wherein the first tine is operatively coupled to the first section of the slot to create an aperture antenna; and
wherein the second tine is operatively coupled to the second portion of the slot to excite the second section of the slot; and
a parasitic element to increase the frequency bandwidth of the radiating elements.

10. The assembly of claim 9, wherein the first tine operates as an aperture antenna relative to the first section of the slot.

11. The assembly of claim 9, comprising a speaker wire to provide data signals and power to the speaker wherein the speaker wire passes across the shunt to prevent noise originating from the speaker wire.

12. The assembly of claim 9, wherein the distance along the slot at which the shunt is placed is selected based on one or more target radio frequencies to be emitted by the first tine of the radiating element and the second tine of the radiating element.

13. The assembly of claim 9, wherein the first tine is 1.3 mm from the first section of the slot.

14. The assembly of claim 9, wherein the second tine is 1.5 mm from the speaker grill.

15. The assembly of claim 9, wherein an entire perimeter of the speaker grill includes the slot and a trench, the slot comprising an undercut portion to receive a plastic trim ring used to hide the slot.

16. The assembly of claim 9, wherein the first tine and the second tine are placed a different distances from the speaker grill.

17. An information handling system to transmit a communication signal comprising:
a wireless interface adapter to, upon execution of computer code at a processor, initiate communication with a wireless network;
a metal C-cover to house a speaker grill, the speaker grill covering a speaker to emit audio waves;
the speaker grill formed within the C-cover, the speaker grill comprising:
a slot formed around a portion of a perimeter of the speaker grill that physically separates the portion of the speaker grill from the C-cover;
a shunt formed at a distance along the slot creating a first portion of the slot and a second portion of the slot;
a forked antenna element wherein:
a first tine of the forked antenna is operatively coupled to the first portion of the slot to excite the first portion of the slot in a first communication radiofrequency (RF) band; and
a second tine of the forked antenna is operatively coupled to the second portion of the slot to excite the second portion of the slot in a second communication RF band.

18. The information handling system of claim 16, wherein the first tine operates as an aperture antenna relative to the first portion of the slot.

19. The information handling system of claim 16, wherein the distance along the slot at which the shunt is placed is selected based on one or more target radio frequencies to be emitted by the first tine of the forked antenna and the second tine of the forked antenna for the first communication RF band and the second communication RF band.

20. The information handling system of claim 16, wherein the first tine and the second tine are placed a different distances from the speaker grill.

* * * * *